(12) United States Patent
Ponulak et al.

(10) Patent No.: US 9,844,873 B2
(45) Date of Patent: Dec. 19, 2017

(54) APPARATUS AND METHODS FOR HAPTIC TRAINING OF ROBOTS

(71) Applicant: Brain Corporation, San Diego, CA (US)

(72) Inventors: Filip Ponulak, San Diego, CA (US); Moslem Kazemi, San Diego, CA (US); Patryk Laurent, San Diego, CA (US); Oleg Sinyavskiy, San Diego, CA (US); Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 15/464,104

(22) Filed: Mar. 20, 2017

(65) Prior Publication Data

US 2017/0232613 A1 Aug. 17, 2017

Related U.S. Application Data

(63) Continuation of application No. 14/102,410, filed on Dec. 10, 2013, now Pat. No. 9,597,797.

(Continued)

(51) Int. Cl.
*G05B 19/18* (2006.01)
*B25J 9/16* (2006.01)
(Continued)

(52) U.S. Cl.
CPC .............. *B25J 9/163* (2013.01); *G05D 1/005* (2013.01); *G05D 1/0088* (2013.01); *G05D 1/0221* (2013.01); *G05B 2219/36425* (2013.01)

(58) Field of Classification Search
CPC ....... A61B 34/30; A61B 90/06; A61B 1/0016; A61B 1/00163; B25J 9/1689
See application file for complete search history.

(56) References Cited

U.S. PATENT DOCUMENTS 3,920,972 A 11/1975 Corwin, Jr. et al.
4,468,617 A 8/1984 Ringwall
(Continued)

FOREIGN PATENT DOCUMENTS

CN 102226740 A 10/2011
EP 2384863 A2 11/2011
(Continued)

OTHER PUBLICATIONS

Abbott L. F. and Nelson S.B. (2000), "Synaptic plasticity: taming the beast", Nature Neuroscience, 3, 1178-1183.
(Continued)

*Primary Examiner* — Ian Jen
(74) *Attorney, Agent, or Firm* — Gazdzinski & Associates, PC

(57) ABSTRACT

Robotic devices may be trained by a trainer guiding the robot along a target trajectory using physical contact with the robot. The robot may comprise an adaptive controller configured to generate control commands based on one or more of the trainer input, sensory input, and/or performance measure. The trainer may observe task execution by the robot. Responsive to observing a discrepancy between the target behavior and the actual behavior, the trainer may provide a teaching input via a haptic action. The robot may execute the action based on a combination of the internal control signal produced by a learning process of the robot and the training input. The robot may infer the teaching input based on a comparison of a predicted state and actual state of the robot. The robot's learning process may be adjusted in accordance with the teaching input so as to reduce the discrepancy during a subsequent trial.

20 Claims, 11 Drawing Sheets

Related U.S. Application Data

(60) Provisional application No. 61/901,235, filed on Nov. 7, 2013.

(51) Int. Cl.
  *G05D 1/00* (2006.01)
  *G05D 1/02* (2006.01)

(56) References Cited

U.S. PATENT DOCUMENTS

| | | | |
|---|---|---|---|
| 4,617,502 A | 10/1986 | Sakaue et al. | |
| 4,638,445 A | 1/1987 | Mattaboni | |
| 4,706,204 A | 11/1987 | Hattori | |
| 4,763,276 A | 8/1988 | Perreirra et al. | |
| 4,852,018 A | 7/1989 | Grossberg et al. | |
| 5,063,603 A | 11/1991 | Burt | |
| 5,092,343 A | 3/1992 | Spitzer et al. | |
| 5,121,497 A | 6/1992 | Kerr et al. | |
| 5,245,672 A | 9/1993 | Wilson et al. | |
| 5,303,384 A | 4/1994 | Rodriguez et al. | |
| 5,355,435 A | 10/1994 | DeYong et al. | |
| 5,388,186 A | 2/1995 | Bose | |
| 5,408,588 A | 4/1995 | Ulug | |
| 5,467,428 A | 11/1995 | Ulug | |
| 5,579,440 A | 11/1996 | Brown | |
| 5,602,761 A | 2/1997 | Spoerre et al. | |
| 5,612,883 A | 3/1997 | Shaffer et al. | |
| 5,638,359 A | 6/1997 | Peltola et al. | |
| 5,673,367 A | 9/1997 | Buckley | |
| 5,687,294 A | 11/1997 | Jeong | |
| 5,719,480 A | 2/1998 | Bock et al. | |
| 5,739,811 A | 4/1998 | Rosenberg et al. | |
| 5,828,812 A * | 10/1998 | Khan | G06N 3/0436 706/1 |
| 5,841,959 A | 11/1998 | Guiremand | |
| 5,875,108 A | 2/1999 | Hoffberg et al. | |
| 5,943,660 A * | 8/1999 | Yesildirek | G05B 13/027 706/10 |
| 5,994,864 A | 11/1999 | Inoue et al. | |
| 6,009,418 A | 12/1999 | Cooper | |
| 6,014,653 A | 1/2000 | Thaler | |
| 6,169,981 B1 | 1/2001 | Werbos | |
| 6,218,802 B1 | 4/2001 | Onoue et al. | |
| 6,243,622 B1 | 6/2001 | Yim et al. | |
| 6,259,988 B1 | 7/2001 | Galkowski et al. | |
| 6,272,479 B1 | 8/2001 | Farry et al. | |
| 6,363,369 B1 | 3/2002 | Liaw et al. | |
| 6,366,293 B1 | 4/2002 | Hamilton et al. | |
| 6,442,451 B1 | 8/2002 | Lapham | |
| 6,458,157 B1 | 10/2002 | Suaning | |
| 6,489,741 B1 | 12/2002 | Genov et al. | |
| 6,493,686 B1 | 12/2002 | Francone et al. | |
| 6,532,454 B1 * | 3/2003 | Werbos | G05B 13/027 706/14 |
| 6,545,705 B1 | 4/2003 | Sigel et al. | |
| 6,545,708 B1 | 4/2003 | Tamayama et al. | |
| 6,546,291 B2 | 4/2003 | Merfeld et al. | |
| 6,581,046 B1 | 6/2003 | Ahissar | |
| 6,601,049 B1 | 7/2003 | Cooper | |
| 6,636,781 B1 | 10/2003 | Shen et al. | |
| 6,643,627 B2 | 11/2003 | Liaw et al. | |
| 6,697,711 B2 | 2/2004 | Yokono et al. | |
| 6,703,550 B2 | 3/2004 | Chu | |
| 6,760,645 B2 | 7/2004 | Kaplan et al. | |
| 6,961,060 B1 | 11/2005 | Mochizuki et al. | |
| 7,002,585 B1 | 2/2006 | Watanabe et al. | |
| 7,024,276 B2 | 4/2006 | Ito | |
| 7,243,334 B1 | 7/2007 | Berger et al. | |
| 7,324,870 B2 | 1/2008 | Lee | |
| 7,342,589 B2 | 3/2008 | Miserocchi | |
| 7,395,251 B2 | 7/2008 | Linsker | |
| 7,398,259 B2 | 7/2008 | Nugent | |
| 7,426,501 B2 | 9/2008 | Nugent | |
| 7,426,920 B1 | 9/2008 | Petersen | |
| 7,668,605 B2 | 2/2010 | Braun et al. | |
| 7,672,920 B2 | 3/2010 | Ito et al. | |
| 7,752,544 B2 | 7/2010 | Cheng et al. | |
| 7,849,030 B2 | 12/2010 | Ellingsworth | |
| 8,015,130 B2 | 9/2011 | Matsugu et al. | |
| 8,145,355 B2 | 3/2012 | Danko | |
| 8,214,062 B2 | 7/2012 | Eguchi et al. | |
| 8,271,134 B2 | 9/2012 | Kato et al. | |
| 8,315,305 B2 | 11/2012 | Petre et al. | |
| 8,340,823 B2 * | 12/2012 | Ohno | G05D 1/0246 700/245 |
| 8,364,314 B2 | 1/2013 | Abdallah et al. | |
| 8,380,652 B1 | 2/2013 | Francis, Jr. | |
| 8,419,804 B2 | 4/2013 | Herr et al. | |
| 8,452,448 B2 | 5/2013 | Pack et al. | |
| 8,467,623 B2 | 6/2013 | Izhikevich et al. | |
| 8,509,951 B2 | 8/2013 | Gienger | |
| 8,571,706 B2 | 10/2013 | Zhang et al. | |
| 8,639,644 B1 | 1/2014 | Hickman et al. | |
| 8,655,815 B2 | 2/2014 | Palmer et al. | |
| 8,751,042 B2 | 6/2014 | Lee et al. | |
| 8,793,205 B1 * | 7/2014 | Fisher | G06N 3/008 706/25 |
| 8,924,021 B2 | 12/2014 | Dariush et al. | |
| 8,958,912 B2 | 2/2015 | Blumberg et al. | |
| 8,972,315 B2 | 3/2015 | Szatmary et al. | |
| 8,990,133 B1 | 3/2015 | Ponulak et al. | |
| 9,008,840 B1 | 4/2015 | Ponulak et al. | |
| 9,015,092 B2 | 4/2015 | Sinyavskiy et al. | |
| 9,015,093 B1 | 4/2015 | Commons | |
| 9,047,568 B1 | 6/2015 | Fisher et al. | |
| 9,056,396 B1 | 6/2015 | Linnell | |
| 9,070,039 B2 | 6/2015 | Richert | |
| 9,082,079 B1 | 7/2015 | Coenen | |
| 9,104,186 B2 | 8/2015 | Sinyavskiy et al. | |
| 9,122,994 B2 | 9/2015 | Piekniewski et al. | |
| 9,144,907 B2 | 9/2015 | Summer et al. | |
| 9,177,245 B2 | 11/2015 | Richert et al. | |
| 9,186,793 B1 | 11/2015 | Meier | |
| 9,189,730 B1 | 11/2015 | Coenen et al. | |
| 9,193,075 B1 | 11/2015 | Cipollini et al. | |
| 9,195,934 B1 | 11/2015 | Hunt et al. | |
| 9,213,937 B2 | 12/2015 | Ponulak | |
| 9,242,372 B2 | 1/2016 | Laurent et al. | |
| 9,314,924 B1 | 4/2016 | Laurent et al. | |
| 2001/0045809 A1 | 11/2001 | Mukai | |
| 2002/0038294 A1 | 3/2002 | Matsugu | |
| 2002/0103576 A1 | 8/2002 | Takamura et al. | |
| 2002/0158599 A1 | 10/2002 | Fujita et al. | |
| 2002/0169733 A1 | 11/2002 | Peters et al. | |
| 2002/0175894 A1 | 11/2002 | Grillo | |
| 2002/0198854 A1 | 12/2002 | Berenji et al. | |
| 2003/0023347 A1 | 1/2003 | Konno et al. | |
| 2003/0050903 A1 | 3/2003 | Liaw et al. | |
| 2003/0108415 A1 | 6/2003 | Hosek et al. | |
| 2003/0144764 A1 | 7/2003 | Yokono et al. | |
| 2003/0220714 A1 | 11/2003 | Nakamura et al. | |
| 2004/0030449 A1 | 2/2004 | Solomon | |
| 2004/0036437 A1 | 2/2004 | Ito | |
| 2004/0051493 A1 | 3/2004 | Furuta et al. | |
| 2004/0128028 A1 | 7/2004 | Miyamoto et al. | |
| 2004/0131998 A1 | 7/2004 | Marom et al. | |
| 2004/0136439 A1 | 7/2004 | Dewberry et al. | |
| 2004/0158358 A1 | 8/2004 | Anezaki et al. | |
| 2004/0162638 A1 | 8/2004 | Solomon | |
| 2004/0167641 A1 | 8/2004 | Kawai et al. | |
| 2004/0172168 A1 | 9/2004 | Watanabe et al. | |
| 2004/0193670 A1 | 9/2004 | Langan et al. | |
| 2004/0267404 A1 | 12/2004 | Danko | |
| 2005/0004710 A1 | 1/2005 | Shimomura et al. | |
| 2005/0008227 A1 | 1/2005 | Duan et al. | |
| 2005/0015351 A1 | 1/2005 | Nugent | |
| 2005/0036649 A1 | 2/2005 | Yokono et al. | |
| 2005/0049749 A1 | 3/2005 | Watanabe et al. | |
| 2005/0054381 A1 | 3/2005 | Lee et al. | |
| 2005/0065651 A1 * | 3/2005 | Ayers | B25J 9/1085 700/245 |
| 2005/0069207 A1 | 3/2005 | Zakrzewski et al. | |
| 2005/0113973 A1 | 5/2005 | Endo et al. | |
| 2005/0119791 A1 | 6/2005 | Nagashima | |

(56) References Cited

U.S. PATENT DOCUMENTS

| | | |
|---|---|---|
| 2005/0125099 A1 | 6/2005 | Mikami et al. |
| 2005/0283450 A1 | 12/2005 | Matsugu et al. |
| 2006/0069448 A1 | 3/2006 | Yasui |
| 2006/0082340 A1 | 4/2006 | Watanabe et al. |
| 2006/0094001 A1 | 5/2006 | Torre et al. |
| 2006/0129277 A1 | 6/2006 | Wu et al. |
| 2006/0129506 A1 | 6/2006 | Edelman et al. |
| 2006/0149489 A1 | 7/2006 | Joublin et al. |
| 2006/0161218 A1 | 7/2006 | Danilov |
| 2006/0161300 A1 | 7/2006 | Gonzalez-Banos et al. |
| 2006/0167530 A1 | 7/2006 | Flaherty et al. |
| 2006/0181236 A1 | 8/2006 | Brogardh |
| 2006/0189900 A1 | 8/2006 | Flaherty et al. |
| 2006/0207419 A1 | 9/2006 | Okazaki et al. |
| 2006/0230140 A1 | 10/2006 | Aoyama et al. |
| 2006/0250101 A1 | 11/2006 | Khatib et al. |
| 2007/0022068 A1 | 1/2007 | Linsker |
| 2007/0074177 A1 | 3/2007 | Kurita et al. |
| 2007/0100780 A1 | 5/2007 | Fleischer et al. |
| 2007/0112700 A1 | 5/2007 | Den Haan et al. |
| 2007/0151389 A1 | 7/2007 | Prisco et al. |
| 2007/0176643 A1 | 8/2007 | Nugent |
| 2007/0200525 A1 | 8/2007 | Kanaoka |
| 2007/0208678 A1 | 9/2007 | Matsugu |
| 2007/0250464 A1 | 10/2007 | Hamilton |
| 2007/0255454 A1 | 11/2007 | Dariush |
| 2007/0260356 A1 | 11/2007 | Kock et al. |
| 2008/0024345 A1 | 1/2008 | Watson |
| 2008/0040040 A1 | 2/2008 | Goto et al. |
| 2008/0097644 A1 | 4/2008 | Kaznov et al. |
| 2008/0100482 A1 | 5/2008 | Lazar |
| 2008/0112596 A1 | 5/2008 | Rhoads et al. |
| 2008/0114710 A1 | 5/2008 | Pucher |
| 2008/0133052 A1 | 6/2008 | Jones et al. |
| 2008/0140257 A1 | 6/2008 | Sato et al. |
| 2008/0154428 A1 | 6/2008 | Nagatsuka et al. |
| 2008/0162391 A1 | 7/2008 | Izhikevich |
| 2008/0208391 A1* | 8/2008 | Hasegawa ............ B62D 57/032 700/245 |
| 2008/0294074 A1 | 11/2008 | Tong et al. |
| 2008/0319929 A1 | 12/2008 | Kaplan et al. |
| 2009/0037033 A1 | 2/2009 | Phillips et al. |
| 2009/0037351 A1 | 2/2009 | Kristal et al. |
| 2009/0043722 A1 | 2/2009 | Nugent |
| 2009/0069943 A1 | 3/2009 | Akashi et al. |
| 2009/0105786 A1 | 4/2009 | Fetz et al. |
| 2009/0231359 A1 | 9/2009 | Bass, II et al. |
| 2009/0234501 A1 | 9/2009 | Ishizaki |
| 2009/0265036 A1 | 10/2009 | Jamieson et al. |
| 2009/0272585 A1 | 11/2009 | Nagasaka |
| 2009/0287624 A1 | 11/2009 | Rouat et al. |
| 2009/0299751 A1 | 12/2009 | Jung |
| 2009/0312817 A1 | 12/2009 | Hogle et al. |
| 2010/0036457 A1 | 2/2010 | Sarpeshkar et al. |
| 2010/0081958 A1 | 4/2010 | She |
| 2010/0086171 A1 | 4/2010 | Lapstun |
| 2010/0119214 A1 | 5/2010 | Shimazaki et al. |
| 2010/0152896 A1 | 6/2010 | Komatsu et al. |
| 2010/0152899 A1 | 6/2010 | Chang et al. |
| 2010/0166320 A1 | 7/2010 | Paquier |
| 2010/0169098 A1 | 7/2010 | Patch |
| 2010/0198765 A1 | 8/2010 | Fiorillo |
| 2010/0222924 A1 | 9/2010 | Gienger et al. |
| 2010/0225824 A1 | 9/2010 | Lazar et al. |
| 2010/0228264 A1 | 9/2010 | Robinson et al. |
| 2010/0286824 A1 | 11/2010 | Solomon |
| 2010/0292835 A1 | 11/2010 | Sugiura et al. |
| 2010/0299101 A1 | 11/2010 | Shimada et al. |
| 2010/0305758 A1 | 12/2010 | Nishi et al. |
| 2010/0312730 A1 | 12/2010 | Weng et al. |
| 2011/0010006 A1 | 1/2011 | Tani et al. |
| 2011/0016071 A1 | 1/2011 | Guillen et al. |
| 2011/0026770 A1 | 2/2011 | Brookshire |
| 2011/0035052 A1 | 2/2011 | McLurkin et al. |
| 2011/0035188 A1 | 2/2011 | Martinez-Heras et al. |
| 2011/0040405 A1 | 2/2011 | Lim et al. |
| 2011/0060460 A1 | 3/2011 | Oga et al. |
| 2011/0060461 A1 | 3/2011 | Velliste et al. |
| 2011/0067479 A1 | 3/2011 | Davis et al. |
| 2011/0071676 A1 | 3/2011 | Sanders et al. |
| 2011/0107270 A1 | 5/2011 | Wang et al. |
| 2011/0110006 A1 | 5/2011 | Meyer et al. |
| 2011/0119214 A1 | 5/2011 | Breitwisch et al. |
| 2011/0119215 A1 | 5/2011 | Elmegreen et al. |
| 2011/0144802 A1 | 6/2011 | Jang |
| 2011/0158476 A1 | 6/2011 | Fahn et al. |
| 2011/0160741 A1 | 6/2011 | Asano et al. |
| 2011/0160906 A1 | 6/2011 | Orita et al. |
| 2011/0160907 A1 | 6/2011 | Orita |
| 2011/0196199 A1 | 8/2011 | Donhowe et al. |
| 2011/0208350 A1 | 8/2011 | Eliuk et al. |
| 2011/0218676 A1 | 9/2011 | Okazaki |
| 2011/0231016 A1 | 9/2011 | Goulding |
| 2011/0244919 A1 | 10/2011 | Aller et al. |
| 2011/0282169 A1 | 11/2011 | Grudic et al. |
| 2011/0296944 A1 | 12/2011 | Carter et al. |
| 2011/0319714 A1 | 12/2011 | Roelle et al. |
| 2012/0008838 A1 | 1/2012 | Guyon et al. |
| 2012/0011090 A1 | 1/2012 | Tang et al. |
| 2012/0011093 A1 | 1/2012 | Aparin et al. |
| 2012/0017232 A1 | 1/2012 | Hoffberg et al. |
| 2012/0036099 A1 | 2/2012 | Venkatraman et al. |
| 2012/0045068 A1 | 2/2012 | Kim et al. |
| 2012/0053728 A1 | 3/2012 | Theodorus et al. |
| 2012/0071752 A1 | 3/2012 | Sewell et al. |
| 2012/0079670 A1 | 4/2012 | Yoon et al. |
| 2012/0109866 A1 | 5/2012 | Modha |
| 2012/0143495 A1* | 6/2012 | Dantu .................. G01C 21/206 701/428 |
| 2012/0144242 A1 | 6/2012 | Vichare et al. |
| 2012/0150777 A1 | 6/2012 | Setoguchi et al. |
| 2012/0150781 A1 | 6/2012 | Arthur et al. |
| 2012/0173021 A1 | 7/2012 | Tsusaka |
| 2012/0185092 A1 | 7/2012 | Ku |
| 2012/0197439 A1 | 8/2012 | Wang et al. |
| 2012/0209428 A1 | 8/2012 | Mizutani |
| 2012/0209432 A1 | 8/2012 | Fleischer et al. |
| 2012/0221147 A1 | 8/2012 | Goldberg et al. |
| 2012/0265580 A1 | 10/2012 | Kim et al. |
| 2012/0296471 A1 | 11/2012 | Inaba et al. |
| 2012/0303091 A1* | 11/2012 | Izhikevich ............. G06N 3/049 607/54 |
| 2012/0303160 A1 | 11/2012 | Ziegler et al. |
| 2012/0308076 A1* | 12/2012 | Piekniewski .......... G06N 3/049 382/103 |
| 2012/0308136 A1* | 12/2012 | Izhikevich ......... G06K 9/00744 382/181 |
| 2013/0000480 A1 | 1/2013 | Komatsu et al. |
| 2013/0006468 A1 | 1/2013 | Koehrsen et al. |
| 2013/0019325 A1 | 1/2013 | Deisseroth et al. |
| 2013/0066468 A1 | 3/2013 | Choi et al. |
| 2013/0073080 A1 | 3/2013 | Ponulak |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073493 A1 | 3/2013 | Modha |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0096719 A1 | 4/2013 | Sanders et al. |
| 2013/0116827 A1* | 5/2013 | Inazumi ................ B25J 9/1612 700/260 |
| 2013/0151442 A1 | 6/2013 | Suh et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0172906 A1 | 7/2013 | Olson et al. |
| 2013/0173060 A1 | 7/2013 | Yoo et al. |
| 2013/0206170 A1 | 8/2013 | Svendsen et al. |
| 2013/0218339 A1 | 8/2013 | Maisonnier et al. |
| 2013/0218821 A1 | 8/2013 | Szatmary et al. |

(56) References Cited

U.S. PATENT DOCUMENTS

| | | |
|---|---|---|
| 2013/0238122 A1* | 9/2013 | Hodgins .................. B25J 9/00 700/245 |
| 2013/0245829 A1 | 9/2013 | Ohta et al. |
| 2013/0251278 A1 | 9/2013 | Izhikevich et al. |
| 2013/0274924 A1 | 10/2013 | Chung et al. |
| 2013/0278631 A1 | 10/2013 | Border et al. |
| 2013/0297541 A1 | 11/2013 | Piekniewski et al. |
| 2013/0297542 A1 | 11/2013 | Piekniewski et al. |
| 2013/0310979 A1 | 11/2013 | Herr et al. |
| 2013/0325244 A1 | 12/2013 | Wang et al. |
| 2013/0325766 A1 | 12/2013 | Petre et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325776 A1 | 12/2013 | Ponulak et al. |
| 2013/0325777 A1 | 12/2013 | Petre et al. |
| 2013/0345718 A1 | 12/2013 | Crawford et al. |
| 2013/0346347 A1 | 12/2013 | Patterson et al. |
| 2014/0012788 A1 | 1/2014 | Piekniewski |
| 2014/0016858 A1* | 1/2014 | Richert .................. G06K 9/62 382/156 |
| 2014/0025613 A1 | 1/2014 | Ponulak |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0081895 A1* | 3/2014 | Coenen .................. G05B 13/027 706/25 |
| 2014/0089232 A1* | 3/2014 | Buibas .................. G06N 3/049 706/11 |
| 2014/0114479 A1 | 4/2014 | Okazaki |
| 2014/0122397 A1 | 5/2014 | Richert et al. |
| 2014/0122398 A1 | 5/2014 | Richert |
| 2014/0156574 A1 | 6/2014 | Piekniewski et al. |
| 2014/0163729 A1 | 6/2014 | Shi et al. |
| 2014/0187519 A1 | 7/2014 | Cooke et al. |
| 2014/0193066 A1 | 7/2014 | Richert |
| 2014/0222739 A1 | 8/2014 | Ponulak |
| 2014/0229411 A1 | 8/2014 | Richert et al. |
| 2014/0244557 A1 | 8/2014 | Piekniewski et al. |
| 2014/0277718 A1 | 9/2014 | Izhikevich et al. |
| 2014/0277744 A1 | 9/2014 | Coenen |
| 2014/0298212 A1 | 10/2014 | Wen |
| 2014/0309659 A1 | 10/2014 | Roh et al. |
| 2014/0350723 A1 | 11/2014 | Prieto et al. |
| 2014/0358284 A1 | 12/2014 | Laurent et al. |
| 2014/0358828 A1 | 12/2014 | Phillipps et al. |
| 2014/0369558 A1 | 12/2014 | Holz |
| 2014/0371907 A1 | 12/2014 | Passot et al. |
| 2014/0371912 A1 | 12/2014 | Passot et al. |
| 2015/0032258 A1 | 1/2015 | Passot et al. |
| 2015/0066479 A1 | 3/2015 | Pasupalak et al. |
| 2015/0094850 A1 | 4/2015 | Passot et al. |
| 2015/0094852 A1 | 4/2015 | Laurent et al. |
| 2015/0120128 A1 | 4/2015 | Rosenstein et al. |
| 2015/0127149 A1 | 5/2015 | Sinyavskiy et al. |
| 2015/0127154 A1 | 5/2015 | Passot et al. |
| 2015/0127155 A1 | 5/2015 | Passot et al. |
| 2015/0148956 A1 | 5/2015 | Negishi |
| 2015/0185027 A1 | 7/2015 | Kikkeri et al. |
| 2015/0204559 A1 | 7/2015 | Hoffberg et al. |
| 2015/0217449 A1 | 8/2015 | Meier et al. |
| 2015/0283701 A1 | 10/2015 | Izhikevich et al. |
| 2015/0283702 A1 | 10/2015 | Izhikevich et al. |
| 2015/0283703 A1 | 10/2015 | Izhikevich et al. |
| 2015/0306761 A1 | 10/2015 | O'Connor et al. |
| 2015/0317357 A1 | 11/2015 | Harmsen et al. |
| 2015/0338204 A1 | 11/2015 | Richert et al. |
| 2015/0339589 A1 | 11/2015 | Fisher |
| 2015/0339826 A1 | 11/2015 | Buibas et al. |
| 2015/0341633 A1 | 11/2015 | Richert |
| 2016/0004923 A1 | 1/2016 | Piekniewski et al. |
| 2016/0014426 A1 | 1/2016 | Richert |
| 2016/0075015 A1 | 3/2016 | Izhikevich et al. |
| 2016/0086050 A1 | 3/2016 | Piekniewski et al. |
| 2016/0086051 A1 | 3/2016 | Piekniewski et al. |
| 2016/0086052 A1 | 3/2016 | Piekniewski et al. |
| 2016/0096270 A1 | 4/2016 | Gabardos et al. |
| 2016/0096272 A1 | 4/2016 | Smith et al. |

FOREIGN PATENT DOCUMENTS

| | | |
|---|---|---|
| JP | H0487423 A | 3/1992 |
| JP | 2003175480 A | 6/2003 |
| RU | 2108612 C1 | 4/1998 |
| WO | WO-2008083335 A2 | 7/2008 |
| WO | WO-2010136961 A1 | 12/2010 |
| WO | WO-2011039542 A1 | 4/2011 |
| WO | WO-2012151585 A2 | 11/2012 |

OTHER PUBLICATIONS

Alvarez, "Review of Approximation Techniques," PhD thesis, chapter 2, pp. 7-14, University of Bradford, 2000.

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet:http://msc.berkeley.edu/wjchen/publications/DSC12.sub.--8726.sub.--FI-.pdf<http: />.

Bartlett et al., "Convexity, Classification, and Risk Bounds" Jun. 16, 2005, pp. 1-61.

Bartlett., et al., "Large Margin Classifiers: Convex Loss, Low Noise, and Convergence Rates," Dec. 8, 2003, 8 pgs.

Bohte, 'Spiking Nueral Networks' Doctorate at the University of Leiden, Holland, Mar. 5, 2003, pp. 1-133 [retrieved on Nov. 14, 2012]. Retrieved from the interne http://homepages.cwi.nl/~sbohte/publication/phdthesis.pdf<url: />.

Bouganis, Alexandros, et al.,"Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Branca, et al. (1995), A Neural Network for Ego-motion Estimation from Optical Flow BMC'95 Proceedings of the 1995 British conference on machine vision (vol. 1), pp. 247-256.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of interspike intervals yield accurate entropy estimates from small datasets.' Journal of neuroscience methods 173.1 (2008): 129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet:< frontiersin.org />.

(56) References Cited

OTHER PUBLICATIONS

Gewaltig et al.. 'NEST (Neural Simulation Tool)', Scholarpedia, 2007. pp. I-15. 2(4): 1430, doi: 1 0.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gollisch et al., 'Rapid neural coding in the retina with relative spike latencies.' Science 319.5866 (2008): 1108-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.
Graham, Lyle J., The Surf-Hippo Reference Manual Version 3.0 B, Mar. 2002, pp. 1-128.
Grollman., et al., "Dogged Learning for Robots," IEEE International Conference on Robotics and Automation (ICRA), 2007.
Hatsopoulos, Visual Navigation with a Neural Network, Published 1991.
Http://www.braincorporation.com/specs/13StemSpecSheet_Rev_Nov11_2013.pdf.
Huang, Fall Detection Using Modular Neural Networks with Back-projected Optical Flow, Published 2007.
Izhikevich E.M. (2006) Polychronization: Computation With Spikes. Neural Computation, 18:245-282.
Izhikevich et al., 'Relating STDP to BCM', Neural Computation (2003) 15, 1511-1523.
Izhikevich, 'Simple Model of Spiking Neurons', IEEE Transactions on Neural Networks, vol. 14, No. 6, Nov. 2003, pp. 1569-1572.
Jin, et al., (2010) "Implementing Spike-Timing-Dependent Plasticity on SpiNNaker Neuromorphic Hardware", WCCI 2010, IEEE World Congress on Computational Intelligence.
Karbowski et al., 'Multispikes and Synchronization in a Large Neural Network with Temporal Delays', Neural Computation 12. 1573-1606 (2000).
Kasabov, "Evolving Spiking Neural Networks for Spatio-and Spectro-Temporal Pattern-Recognition", IEEE 6th International Conference Intelligent Systems 2012 [Retrieved on Jun. 24, 2014], Retrieved from the Internet: http://ncs.ethz.ch/projects/evospike/publications/evolving-spiking-neural-networks-for-spatio-and-spectro-temporal-pattern-recognition-plenary-talk-ieee-is/view.
Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet< URL: http://www-ee.uta.edu/eeweb/IP/Courses/SPR/Reference/Khotanzad.pdf.
Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.
Laurent, 'The Neural Network Query Language (NNQL) Reference' [retrieved on Nov. 12, 2013]. Retrieved from the Internet< URL'https://code.google.com/p/ nnql/issues/detail?id=1>.
Lazar et al. 'A video time encoding machine', in Proceedings of the 15th IEEE International Conference on Image Processing ICIP '08 2008, pp. 717-720.
Lazar, et al., "Consistent recovery of sensory stimuli encoded with MIMO neural circuits," Computational intelligence and neuroscience, 2010.
Lazar, et al., 'Multichannel time encoding with integrate-and-fire neurons.' Neurocomputing 65 (2005): 401-407.
Makridakis et al., "Evaluating Accuracy (or Error) Measures", INSEAD Technical Report, 1995/18/TM.
Masquelier, Timothee, 'Relative spike time coding and STOP-based orientation selectivity in the early visual system in natural continuous and saccadic vision: a computational model.' Journal of computational neuroscience 32.3 (2012): 425-441.
Miller III, "Real-Time Application of Neural Networks for Sensor-Based Control of Robots with Vision," IEEE Transactions on Systems, Man, and Cypernetics Jul./Aug. 1989, vol. 19 (4), pp. 825-831.
Nguyen et al., "Estimating divergence functionals and the likelihood ratio by penalized convex risk minimization" 2007, pp. 1-8.
Nichols, A Reconfigurable Computing Architecture for Implementing Artificial Neural Networks on FPGA, Master's Thesis, The University of Guelph, 2003, pp. 1-235.
Park, et al., Transfer of Skills between Human Operators through Haptic Training with Robot Coordination. International Conference on Robotics and Automation Anchorage Convention District, Anchorage, Alaska, USA, pp. 229-235 [online], 2010 [retrieved Dec. 3, 2015]. Retrieved from the Internet:.
Paugam-Moisy, et al., "Computing with Spiking Neuron Networks" Handbook of Natural Computing, 40 pages Springer, Heidelberg (2009).
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet< URL: http://citeseerx.ist.psu.edu!viewdoc/download?doi=0.1.1.5.4346&rep—repl&type-pdf.
Sato et al., 'Pulse interval and width modulation for video transmission.' Cable Television, IEEE Transactions on 4 (1978): 165-173.
Schemmel, J., et al., Implementing synaptic plasticity in a VLSI spiking neural network model. In: Proceedings of the 2006 Intenational Joint Conference on Neural Networks (IJCNN'06), IEEE Press (2006) Jul. 16-21, 2006, pp. 1-6 [online], [retrieved on Aug. 24, 2012]. Retrieved from the Internet Introduction.
Simulink.RTM. model [online], [Retrieved on Dec. 10, 2013] Retrieved from <:URL: http://www.mathworks.com/ products/simulink/index.html>.
Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi% 2F10.1371%2Fjournal,pcbi.1000879<url:></url:>.
Walters, "Implementation of Self-Organizing Neural Networks for Visuo-Motor Control of an Industrial Robot," IEEE Transactions on Neural Networks, vol. 4 (1), Jan. 1993, pp. 86-95.
Wang 'The time dimension for scene analysis.' Neural Networks, IEEE Transactions on 16.6 (2005): 1401-1426.
Zhou, Computation of Optical Flow Usinga Neural Network, Published 1988.

\* cited by examiner

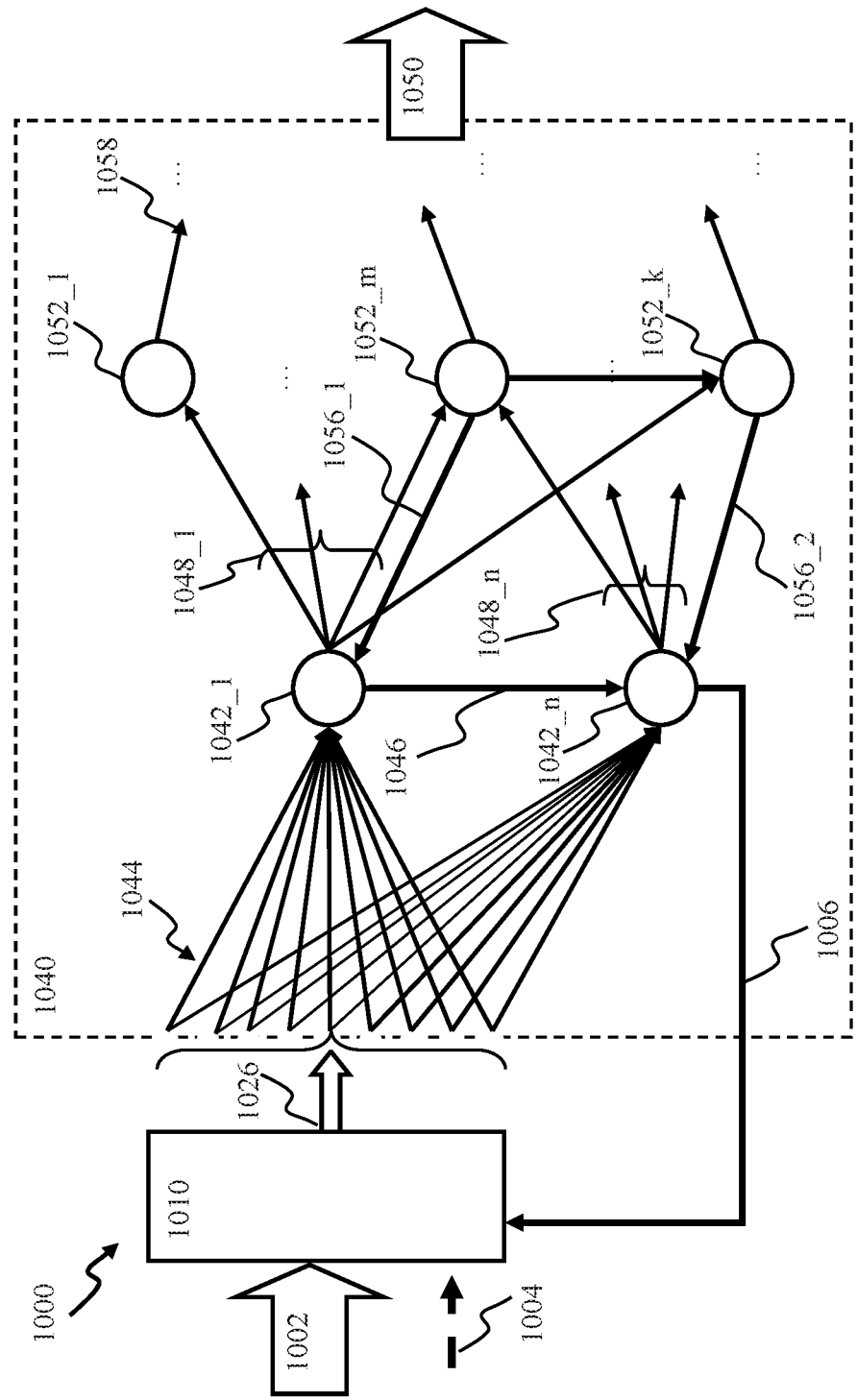

APPARATUS AND METHODS FOR HAPTIC TRAINING OF ROBOTS

PRIORITY AND CROSS-REFERENCE TO RELATED APPLICATIONS

This application is a continuation of and claims the benefit of priority to U.S. patent application Ser. No. 14/102,410, filed on Dec. 10, 2013, entitled "Apparatus and Methods for Haptic Training of Robots", issuing as U.S. Pat. No. 9,597, 797 on Mar. 21, 2017, which claims the benefit of priority to U.S. Provisional Patent Application Ser. No. 61/901,235, filed on Nov. 7, 2013, entitled "Apparatus and Methods for Haptic Training of Robots", each of which is incorporated herein by reference in its entirety.

This application is related to co-owned and co-pending U.S. patent application Ser. No. 14/070,114, filed on Nov. 1, 2013 and entitled "APPARATUS AND METHODS FOR ONLINE TRAINING OF ROBOTS"; Ser. No. 14/070,239, filed on Nov. 1, 2013 and entitled "REDUCED DEGREE OF FREEDOM ROBOTIC CONTROLLER APPARATUS AND METHODS"; Ser. No. 14/070,269, filed on Nov. 1, 2013 and entitled "APPARATUS AND METHODS FOR OPERATING ROBOTIC DEVICES USING SELECTIVE STATE SPACE TRAINING"; Ser. No. 14/040,520, entitled "APPARATUS AND METHODS FOR TRAINING OF ROBOTIC CONTROL ARBITRATION", filed Sep. 27, 2013; Ser. No. 14/040,498, entitled "ROBOTIC CONTROL ARBITRATION APPARATUS AND METHODS", filed Sep. 27, 2013; Ser. No. 13/953,595 entitled "APPARATUS AND METHODS FOR CONTROLLING OF ROBOTIC DEVICES", filed Jul. 29, 2013; U.S. patent application Ser. No. 13/918,338 entitled "ROBOTIC TRAINING APPARATUS AND METHODS", filed Jun. 14, 2013; Ser. No. 13/918,298 entitled "HIERARCHICAL ROBOTIC CONTROLLER APPARATUS AND METHODS", filed Jun. 14, 2013; Ser. No. 13/918,620 entitled "PREDICTIVE ROBOTIC CONTROLLER APPARATUS AND METHODS", filed Jun. 14, 2013; Ser. No. 13/907,734 entitled "ADAPTIVE ROBOTIC INTERFACE APPARATUS AND METHODS", filed May 31, 2013; Ser. No. 13/842,530 entitled "ADAPTIVE PREDICTOR APPARATUS AND METHODS", filed Mar. 15, 2013; Ser. No. 13/842,562 entitled "ADAPTIVE PREDICTOR APPARATUS AND METHODS FOR ROBOTIC CONTROL", filed Mar. 15, 2013; Ser. No. 13/842,616 entitled "ROBOTIC APPARATUS AND METHODS FOR DEVELOPING A HIERARCHY OF MOTOR PRIMITIVES", filed Mar. 15, 2013; Ser. No. 13/842,647 entitled "MULTICHANNEL ROBOTIC CONTROLLER APPARATUS AND METHODS", filed Mar. 15, 2013; and Ser. No. 13/842,583 entitled "APPARATUS AND METHODS FOR TRAINING OF ROBOTIC DEVICES", filed Mar. 15, 2013; each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to machine learning, operation, and training of robotic devices.

Background

Robotic devices may be used in a variety of applications, such as manufacturing, medical, safety, military, exploration, elder care, healthcare, and/or other applications. Some existing robotic devices (e.g., manufacturing assembly and/or packaging robots) may be programmed in order to perform various desired functions. Some robotic devices (e.g., surgical robots) may be remotely controlled by humans. Some robotic devices may learn to operate via exploration.

Programming robots may be costly and remote control by a human operator may cause delays and/or require high level of dexterity from the operator. Furthermore, changes in the robot model and/or environment may require changes in the programming code. Remote control typically relies on user experience and/or agility that may be inadequate when dynamics of the control system and/or environment (e.g., an unexpected obstacle appears in path of a remotely controlled vehicle) change rapidly.

SUMMARY

One aspect of the disclosure relates to a processor-implemented method of operating a robot. The method may be performed by one or more processors configured to execute computer program instructions. The method may comprise: operating, using one or more processors, the robot to perform a task characterized by a target trajectory; and responsive to observing a discrepancy between an actual trajectory and the target trajectory, modifying the actual trajectory via a physical contact with the robot. The performance of the task by the robot may be configured based on a learning process configured to produce a first control signal. The modification of the actual trajectory may be configured to cause the robot to determine a second control signal, and to transition the actual trajectory towards the target trajectory using the first control signal and the second control signal.

In some implementations, the learning process may comprise a supervised learning process configured based on a teaching signal comprising a combination of the first control signal and the second control signal.

Another aspect of the disclosure relates to a non-transitory computer readable medium comprising a plurality of instructions. In one embodiment, the plurality of instructions, effectuate control of a robotic apparatus by: based on a context, determining a first control signal configured to transition the robotic apparatus to a first state; determining a discrepancy; and determining a second control signal based on the discrepancy, the second control signal configured to transition the robotic apparatus to the current state. The current state is configured based on the first control signal and a state modification, and the state modification is applied via a physical contact.

Another aspect of the disclosure relates to a robotic apparatus. In one embodiment, the robot apparatus includes: a manipulator having first and second joints characterized by first and second joint angles, respectively; a sensor module configured to convey information related to one or more of an environment of the robot and the manipulator; and an adaptive controller operable in accordance with a learning process configured to guide the manipulator to a target state in accordance with the information. The adaptive robot apparatus determines a discrepancy; and updates the learning process based on the discrepancy. The discrepancy is configured based on an intervention by a user, the intervention including modification of the first and the second joint angles via a physical contact with the manipulator; and the updated learning process includes determination of a correction signal, the correction signal configured to guide the manipulator to the current state based on an occurrence of the information.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 10 is a block diagram illustrating an artificial neuron network processing apparatus useful with an adaptive controller of a robotic device such as the one depicted in FIG. 9 in accordance with one or more implementations.

Figure 1:
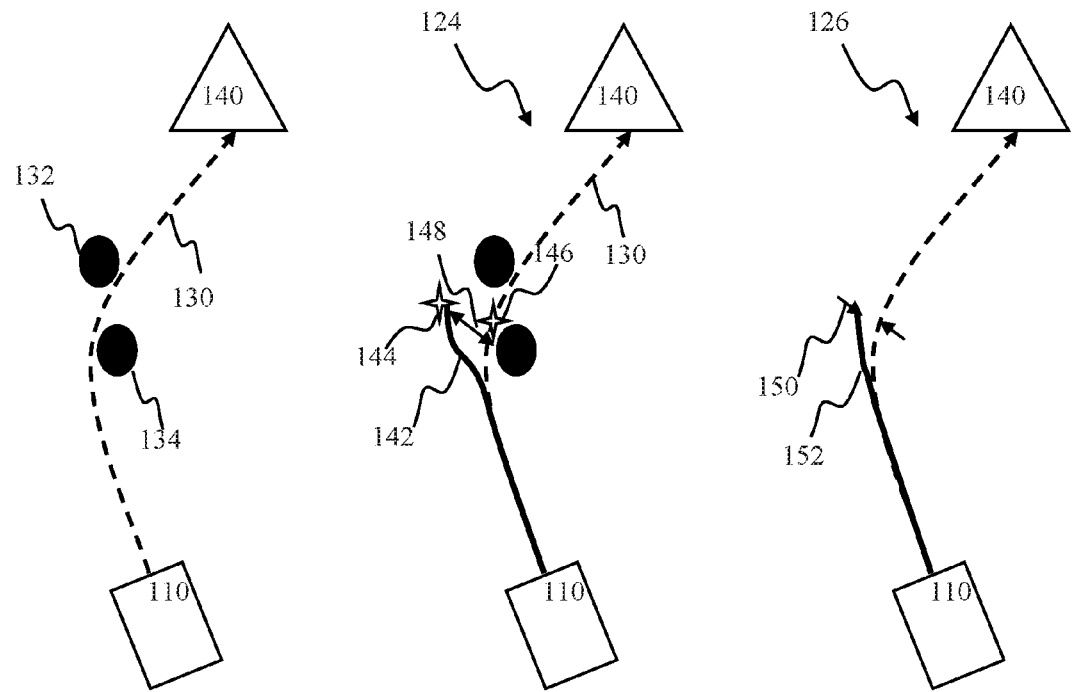
FIG. 1 is a graphical illustration depicting trajectories for use in haptic training of a robot, in accordance with one or more implementations.

All Figures disclosed herein are © Copyright 2017 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, and other implementations are possible by way of interchange of or combination with some or all of the described or illustrated elements. Wherever convenient, the same reference numbers will be used throughout the drawings to refer to same or like parts.

Where certain elements of exemplary implementations may be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be electrical, optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB®, PASCAL, Python®, assembly language, markup languages (e.g., HTML, SGML, XML, VoXML), object-oriented environments (e.g., Common Object Request Broker Architecture (CORBA)), Java® (e.g., J2ME®, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of elements in or on to the surface of a thin substrate. By way of non-limiting example, integrated circuits may include field programmable gate arrays (e.g., FPGAs), a programmable logic device (PLD), reconfigurable computer fabrics (RCFs), application-specific integrated circuits (ASICs), printed circuits, organic circuits, and/or other types of computational circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, and/or other), USB (e.g., USB2), Ethernet (e.g., 10/100, 10/100/1000 (Gigabit Ethernet), 10-Gig-E, and/or other), MoCA, Coaxsys (e.g., TVnet™), radio frequency tuner (e.g., in-band/or OOB, cable modem, and/or other), Wi-Fi (802.11), WiMAX (802.16), PAN (e.g., 802.15), cellular (e.g., 3G, LTE/LTE-A/TD-LTE, GSM, and/or other), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Apparatus and methods for haptic training of robotic devices are disclosed herein. Robotic devices may be trained to perform a target task (e.g., recognize an object, approach a target, avoid an obstacle, and/or other tasks). In some implementations, performing the task may be achieved by the robot by following one of two or more spatial trajectories. By way of an illustration, a robotic vacuum apparatus may avoid a chair by passing it on the left or on the right. A training entity may assist the robot in selecting a target trajectory out of two or more available trajectories. In one or more implementations, the training entity may comprise a human user and/or a computerized controller device.

The robot may comprise an adaptive controller configured to generate control commands based on one or more of the teaching signal, sensory input, performance measure associated with the task, and/or other information. Training may comprise a plurality of trials. During one or more first trials, the trainer may observe operation of the robot. The trainer may refrain from providing the teaching signal to the robot. The robot may select one of the two trajectories (e.g., initialize a maneuver to the left of the chair). Upon observing the trajectory choice by the robot, the trainer may provide a teaching input configured to indicate to the robot a target trajectory. In some implementations, such teaching input may comprise a left turn control command issued by the trainer via a remote interface device (e.g., a joystick). The teaching input may be configured to affect robot's trajectory during subsequent trials so that probability of the robot selecting the same trajectory (e.g., passing the obstacle on the left) may be increased, compared to a random trajectory selection, and/or trajectory selection by the robot in absence of the teaching input. Upon completing a sufficient number of trials, the robot may be capable of consistently navigating the selected trajectory in absence of the teaching input.

Online robot training methodology described herein may enable more reliable decision making and reduce confusion when operating robotic controllers in order to perform a target task via two or more trajectories.

FIG. 1 illustrates an exemplary trajectory configuration useful with online learning methodology described herein. A robotic device 110 may be trained to approach the target 140 and avoid obstacles 132, 134. The target approach/avoidance task of the device 110 may be characterized by a target trajectory 130. Training may be performed by a training entity over multiple trials (e.g., 124, 126 in FIG. 1). Robot operation during a given trial may be based on one or more control commands generated by a controller of the robot in accordance with sensory context. In one or more implementations the context may comprise information about the position and/or movement of the robot 110, obstacles 132, 134, and/or the target 140. The robot's controller may comprise a predictor module, e.g., described below with respect to FIGS. 3-4B.

The training entity may comprise a human user and/or a computerized agent. During a given trial, the training entity may observe actual trajectory of the robot, e.g., the trajectory 142 during the trial 124 in FIG. 1. As shown in FIG. 1, the actual trajectory (shown by the solid line 142) of the robot at a location 144 may diverge from the target trajectory (shown by the broken line 130) by of an amount indicated by an arrow 148. Based on detecting the discrepancy 148 between the target trajectory 130 and the actual trajectory 142, the training entity may provide a teaching input to the robotic device 110 at the location 144. The training input may comprise a haptic action, characterized by a physical contact between the trainer and the robotic device. In some implementations, the haptic action may comprise one or more of a push, a pull, a movement (e.g., pick up and move, move forward, backwards, rotate, rich for an object, pick up, grasp, manipulate, release, and/or other movements), a bump, moving the robot or a portion thereof along a target trajectory, holding the robot in place, and/or other physical interactions of the trainer with the device 110. In one or more implementations of training a manipulator arm, the haptic action may comprise the trainer grabbing and moving the arm along the target trajectory. The arm may be equipped with force/torque sensor. Based on the sensor readings from the force/torque vectors generated by the trainer may be inferred. The controller may utilize the inferred force/torque sensors in order to produce control commands configured to repeat the motion of the arm due to the trainer haptic input.

As a result of the teaching haptic input, the robot actual trajectory may be adjusted to location 146. A controller of the robot 110 may be configured to detect the trajectory displacement 148. Trajectory displacement 148 may be characterized by a change in the state of the robot. In one or more implementations, the robot state change may be based on a modification of one or more parameters. Examples of such parameters may include one or more of motion characteristics of robotic platform (e.g., speed, acceleration, orientation, rotation, and/or other motion characteristics), joint position, motor current draw, motor torque, force on a motor/joint, and/or other parameters. In one or more implementations, the unpredicted (e.g., due to trainer actions) change in the state of the robotic device may be interpreted as the teaching input. In some implementations wherein a state change may occur due to an external condition (e.g., a collision with an obstacle, a skid due to a loss of traction, and/or other external condition) the occurrence of the training input may be indicated to the robotic controller using, e.g., visual and/or audio signal (clues) accompanying the haptic input. Such signal may comprise an audible command (e.g., a click), appearance of trainer body (e.g., a user hand and/or a trainer manipulator) within a sensory video frame. In some implementations, the teaching input may be inferred using one or more tactile sensors mounted on the robotic body. Activation of a specific sensor may be interpreted as an intention of the user for the robot to change trajectory of the robot in a specific way. By way of an example, activation of a tactile sensor mounted on the back of a mobile robotic platform may be interpreted as a teaching command to move forward. In one or more implementations, mapping of the user intentions onto the particular sensor activation may be pre-defined (e.g., hand-coded) or learned using supervised learning or reinforcement learning.

Based on inferring the training input associated with the state adjustment 148, the controller of the robot may adjust its learning process in order to take into account the teaching input. For example, based on an output produced by the adjusted learning process during a subsequent trial 126, the trajectory 152 of the robot may be configured closer to the target trajectory 130 (e.g., the discrepancy 150 being smaller than the discrepancy 148).

Various approaches may be utilized in order to determine a discrepancy between the current state and the target state along the trajectory. In one or more implementations, a distance measure, a norm, a maximum absolute deviation, a signed/unsigned difference, a correlation, a point-wise comparison, and/or a function of an n-dimensional distance (e.g., a mean squared error) may be utilized. In one or more implementations, the distance D between the actual x and the predicted state $x^p$ may be determined as follows:

$$D=(x^p-x), \qquad (Eqn.\ 1)$$

$$D=\text{sign}(x^p)-\text{sign}(x), \qquad (Eqn.\ 2)$$

$$D=\text{sign}(x^p-x). \qquad (Eqn.\ 3)$$

Figure 2:
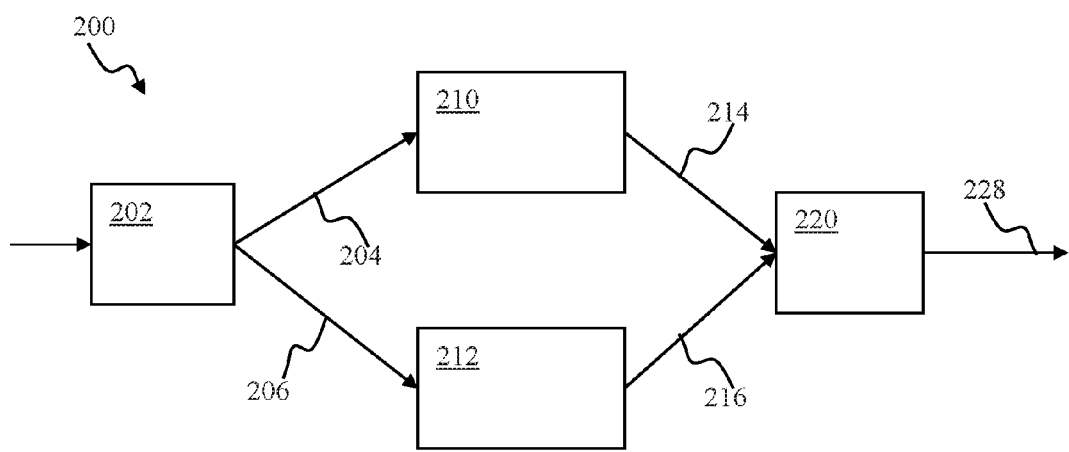
FIG. 2 is a functional block diagram illustrating a robotic controller apparatus configured for haptic learning, in accordance with one or more implementations.

FIG. 2 illustrates a robotic apparatus configured to implement haptic learning, in accordance with one or more implementations. The apparatus 200 may comprise a robotic platform 210 (e.g., a mobile rover, an aerial vehicle, a manipulator, and/or other robotic platform) that is configured to traverse a spatial extent. The platform may comprise one or more actuators (e.g., motors) that may be controlled by an adaptive controller module 202. The controller 202 may be operable in accordance with a learning process configured to determine control commands 204 using any applicable methodologies including, e.g., an adaptive predictor described in U.S. patent application Ser. No. 13/842, 562 entitled "ADAPTIVE PREDICTOR APPARATUS AND METHODS FOR ROBOTIC CONTROL", filed Mar. 15, 2013, incorporated supra.

The apparatus 200 may further comprise a prediction module 212 configured to determine a forward model (FM) of the platform 210 operation responsive to the control input 204. The FM module may receive a copy 206 of the control input 204 (e.g., turn 90° left) and a sensory input (e.g., comprising representation of robot's environment and/or state of the platform 210) and determine a predicted outcome of executing the action (e.g., position of the platform and/or one or more objects in the sensory input subsequent to the 90° left turn by the platform, a predicted position of a joint, and/or other actions). In one or more implementations, the FM may implement a dynamic and/or a kinematic model of the robotic platform 210 operation. The model may utilize, e.g., joint force and/or torque parameters in order to estimate the platform motion.

In some implementations of haptic training, a trainer may interfere with the action execution by the platform 210 via a physical contact (e.g., haptic action) with the platform 210 In some implementations, the haptic action may comprise one or more of a push, a pull, movement (e.g., pick up and move), a bump, and/or other interactions of the trainer with the platform 210. The action may be considered as an external event occurring without an explicit indication to the controller of the platform 210

The predicted state information 216 may be provided by the FM module to a comparator module 220 that may compare actual state information 214 to the predicted state information 216. In one or more implementations, the actual platform state information 214 may be determined using any applicable methodologies. Examples of such methodologies may include one or more of kinematic sensing (e.g., sensing position, velocity, acceleration, orientation, and/or other kinematics) using appropriate sensors (e.g., encoders, force sensor, torque sensor, tactile sensor, light sensor, sound sensor, GPS device, and/or other sensors) mounted on the platform, and/or other methodologies.

The comparator module 220 may utilize the predicted and the actual state information in order to infer external intervention, e.g., the teaching input. The comparator may determine a discrepancy between predicted and actual (e.g., observed) state parameter(s) (e.g., joint orientation, force and/or torque of a motor). Various methods may be utilized in order to identify user intervention by estimating when and what external forces/torques are applied to the robotic body.

In some implementations, estimation of the force/torque exerted by a trainer (the, so called, contact forces) may be achieved using an internal model configured to predict expected unconstrained readings from the force/torque sensors and by comparing them with the actual sensory readings. The term "unconstrained reading" may refer to a sensory input during action execution by the robot in the absence of contact with external bodies. Examples of non-contact forces may comprise gravity, inertial, Coriolis, elastic, electromagnetic forces, and/or other non-contact forces. A discrepancy between the actual force/torque reading and the expected non-contact forces (provided by the internal model) may indicate a contact force applied to the robotic body. In one or more implementations, the internal model providing predictions may be hand-coded and/or learned.

By way of an illustration, in accordance with a dynamic and/or a kinematic model of the robotic platform, a torque of X [N×m] may be expected to result in a joint angle change of 30°. The measured angle of 10° may indicate an environmental influence (e.g., an obstruction, wind resistance, sliding on ice, and/or other environmental influences) and/or trainer physical intervention. In order to distinguish robot state changes due to the trainer physical intervention from environmental influences, a user intervention indication may be used. In some implementations, a vision-based system may be employed in order to identify and indicate to the robot whether a physical contact is made between the robot and the trainer and/or a robot and another body or object.

The comparator 220 output 228 may be utilized in order to apply the teaching input to the learning process of the controller 202. In one or more implementations, the controller 202 may evaluate the signal 228 in order to determine user intervention. Based on characteristics of the intervention (e.g. the direction in which the user guides the robot to move), the controller may use available optimization algorithms in order to adapt its learning process and to produce output (e.g., 204, 206) that is consistent with the identified user intervention. For example, the produce motor commands configured to move the robot in the same direction as indicated by the user intervention in the signal 228. In one or more implementations, the controller learning process may be configured using a look-up table (LUT), a principal component decomposition (e.g., a Fourier, wavelet, spheroidal, and/or other functions) an artificial neuron network (ANN), and/or other. In some implementations, the FM may be implemented using a basis function kernel expansion technique, e.g., such as described in U.S. patent application Ser. No. 13/656,987, filed on Oct. 22, 2012 and entitled A PROPORTIONAL-INTEGRAL-DERIVATIVE CONTROLLER EFFECTING EXPANSION KERNELS COMPRISING A PLURALITY OF SPIKING NEURONS ASSOCIATED WITH A PLURALITY OF RECEPTIVE FIELDS", the foregoing being incorporated herein by reference in its entirety. The learning process adjustment may comprise adding and/or modifying one or more entries in the LUT, the decomposition coefficients, and/or modifying efficacy of one or more connections of the ANN.

Figure 3:
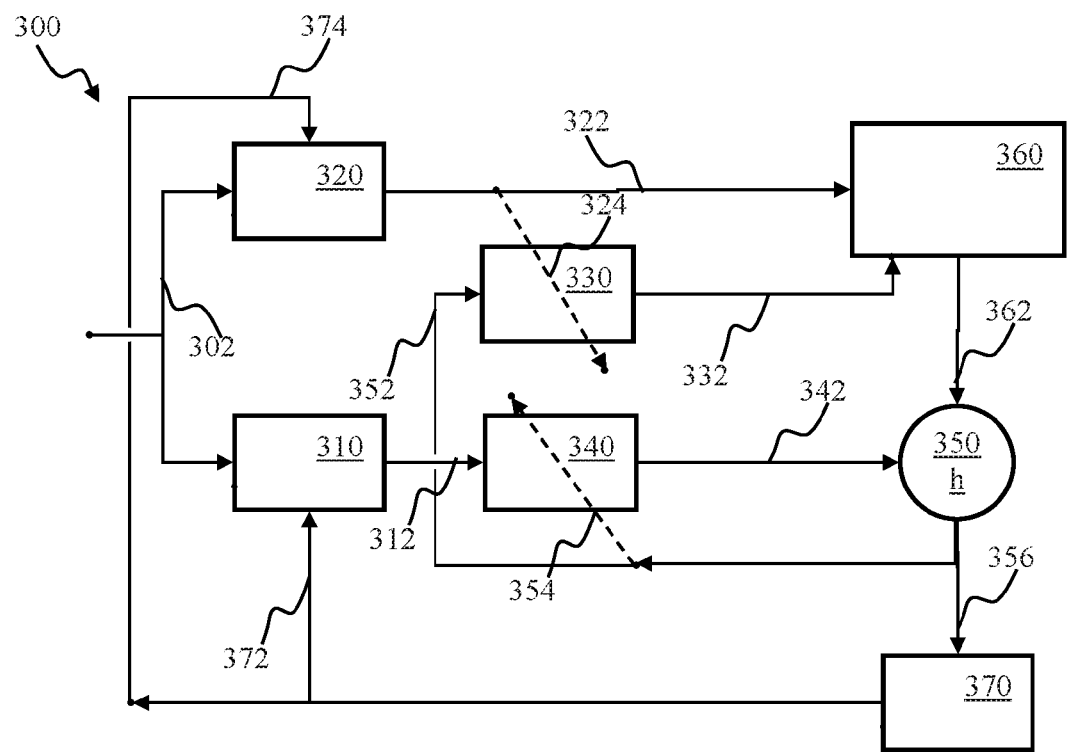
FIG. 3 is a functional block diagram illustrating use of an adaptive predictor apparatus by a robotic controller configured for haptic learning, in accordance with one or more implementations.

FIG. 3 illustrates use of an adaptive predictor apparatus by a robotic controller configured for haptic learning, in accordance with one or more implementations. The apparatus 300 may comprise a robotic platform 370 (e.g., a mobile rover, aerial vehicle, and/or a manipulator) configured to perform a target action based on the control signal 356. The target action may be characterized by a target trajectory (e.g., 130 in FIG. 1). The robotic apparatus 300 may receive sensory input 302 configured to convey information related to the robot's environment. The target task may be configured based on one or more objects (targets/obstacles) being present in the robot's environment. The apparatus 300 may comprise one or more feature extractors 310. The feature extractor 310 may be configured to determine one or more targets and/or obstacles using the sensory input 302 and/or a feedback 372 from the platform 370. The detected feature information 312 may comprise one or more of object position, size, color, platform position, and/or other feature information.

The robotic platform 370 may comprise one or more controllable motor actuators, joints, artificial limbs, and/or other components. The apparatus 300 may comprise an adaptive predictor 340 configured to determine a predicted motor control output 342 for operating the actuators. The predictor 340 may be operable in accordance with supervised learning process configured based on the teaching signal 354. The predicted control signal 342 may be combined with a control signal 362 by a combiner 350. The predictor and/or combiner may be operable using, for example, adaptive predictor methodology described in U.S. patent application Ser. No. 13/842,647 entitled "MULTI-CHANNEL ROBOTIC CONTROLLER APPARATUS AND METHODS", filed Mar. 15, 2013; and Ser. No. 13/842,583 entitled "APPARATUS AND METHODS FOR TRAINING OF ROBOTIC DEVICES", filed Mar. 15, 2013, incorporated supra. The output of the combiner 350 may be utilized to adapt the predictor 310 learning process. In some implementations, the predictor 310 teaching input 354 may be configured based on the combiner 350 output.

The feature extractor 320 may be configured to determine state of the robotic platform based on the sensory input 302 and/or platform feedback 374. The detected state 322 may comprise one or more of joint position, motor torque/force, platform speed/orientation, and/or other information.

The apparatus 300 may comprise an adaptive predictor 330 configured to determine a predicted state of the platform based on the control action 356. The predictor 330 may be operable in accordance with a supervised learning process configured based on the teaching signal 324. The predictor 330 may be configured to implement a forward model of the platform, e.g., as described with respect to FIG. 2 above. In some implementations, a forward model may determine causal relationship between an action (e.g., a motor command) and its outcome (e.g., sensory consequences). A forward model may use as input a copy of a motor command (in FIG. 3, signal 352) and may produce a predicted change of a state of the platform (370 in FIG. 3) due to the motor command.

The predictor 330 may utilize the FM in order to produce predicted state output 332 that may correspond to the control output 356 of the combiner 350 provided to the predictor 330 via the pathway 352. The predictor 330 combiner may be operable using, for example, adaptive predictor methodology described in the '647 and/or '583 applications referenced above. The module 330 may use the learning process in order to adjust (e.g., calibrate) it FM implementations against actual realization of the platform 370 operation. In one or more implementations, the FM may be based on supervised learning; the calibration may be used in order to account for physical imperfections of the platform (e.g., friction, thermal effects, and/or other imperfections), external influences (e.g., wind, temperature changes, and/or other external influences), and/or other factors.

The apparatus 300 may comprise an adaptive controller module 360 configured to determine the control signal 362. In some implementations, the control signal 362 may be interpreted as a correction for, e.g., the predicted motor control signal 342. The control signal 362 may be determined based on a discrepancy between the predicted state information 332 and the actual state of the platform 322 determined from the platform feedback and/or the sensory input.

Figure 4A:
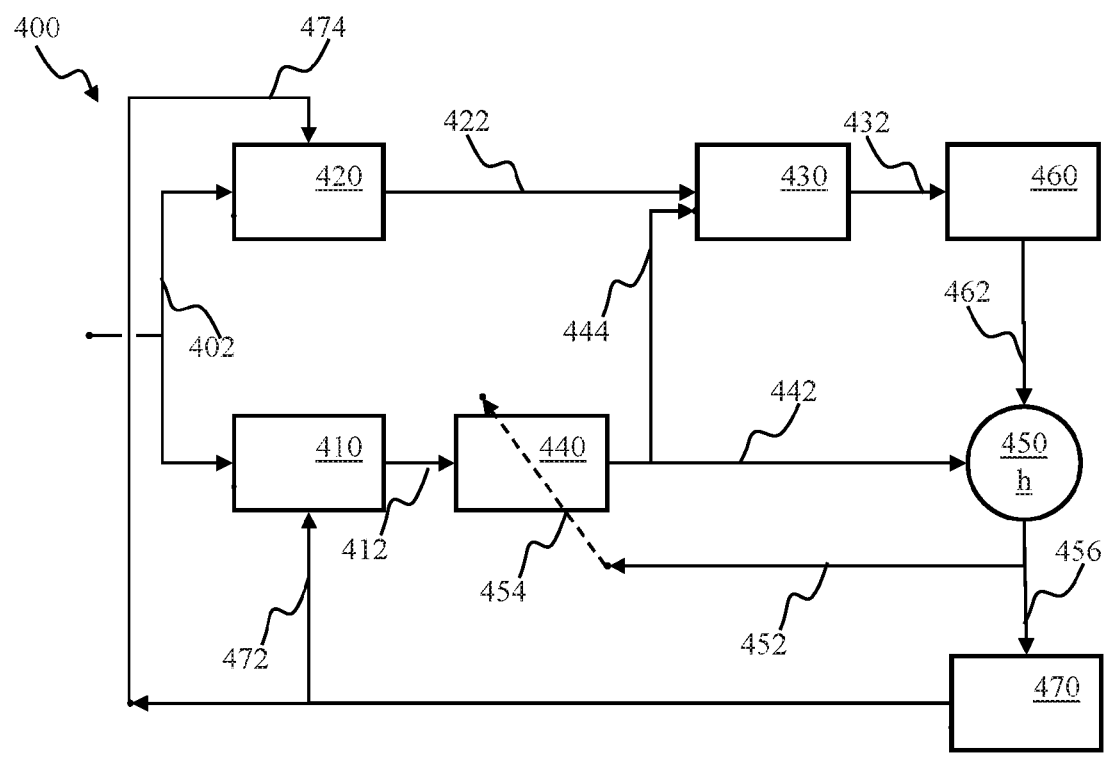
FIG. 4A is a functional block diagram illustrating an adaptive apparatus configured to determine a teaching input during haptic training based on motion of the robotic platform, in accordance with one or more implementations.

FIG. 4A illustrates an adaptive apparatus configured to determine a teaching input during haptic training based on motion of the robotic platform, in accordance with one or more implementations. The apparatus 400 may comprise a robotic platform 470 (e.g., a mobile rover, aerial vehicle, a manipulator, and/or other platform) configured to perform a target action based on the control signal 456. The control command 456 may be configured to provide a motor power indication (e.g., a current) in one or more implementation. The robotic apparatus 400 may receive sensory input 402 configured to convey information related to the robot's environment. The target task may be configured based on one or more objects (targets/obstacles) being present in the robot's environment.

The apparatus 400 may comprise one or more feature extractors 410, 420. The feature extractor 410 may be configured to determine information related to one or more targets and/or obstacles using the sensory input 402 and/or a feedback 472 from the platform 470. The detected feature information 412 may comprise one or more of object position, size, color, platform position and/or other feature information.

The robotic platform 470 may comprise one or more controllable motor actuators, joints, artificial limbs, and/or other components. The apparatus 400 may comprise an adaptive predictor 440 configured to determine a predicted motor control output 442 for operating the actuators. The predictor 440 may be operable in accordance with supervised learning process configured based on the teaching signal 454. The predicted control signal 442 may comprise a motor power indication (e.g., a current draw) in one or more implementations.

The predicted control signal 442 may be combined with a control signal 462 by a combiner 450. The predictor and/or combiner may be operable using, for example, adaptive predictor methodology described in U.S. patent application Ser. No. 13/842,647 entitled "MULTICHANNEL ROBOTIC CONTROLLER APPARATUS AND METHODS", filed Mar. 15, 2013; and Ser. No. 13/842,583 entitled "APPARATUS AND METHODS FOR TRAINING OF ROBOTIC DEVICES", filed Mar. 15, 2013, incorporated supra. The output of the combiner 450 may be utilized to adapt the learning process of the predictor 440 via the teaching signal 454. In some implementations, the teaching signal 454 may comprise a combination of the predicted control signal 442 and the control signal 462.

The feature extractor 420 may be configured to determine actual state of the robotic platform based on the sensory input 402 and/or platform feedback 474. The detected state 422 may comprise velocity of the platform 470 (e.g., rover velocity and/or limb velocity).

In one or more implementations of haptic training, the actual state 422 of the platform 470 may be configured based on a teaching input due to one or more haptic actions e.g., as described above with respect to FIGS. 1-2.

The apparatus 400 may further comprise an adaptive predictor 430 configured to infer presence and/or magnitude of the teaching input based on predicted control signal 442, received by the predictor module 430 via the pathway 444, and actual state 422 of the platform. In one or more implementations, the module 430 may incorporate a forward model of the platform 470 configured to relate one state parameter (e.g., the predicted motor current command ($c^p$ ($c^p$)) to another state parameter (e.g., the actual platform velocity $v^a v^a$) as follows:

$$c^t = F(c^p, v^a) c^t = F(c^p, v^a) \qquad \text{(Eqn. 4)}$$

where $c^t c^t$ denotes the inferred power applied to the platform due to the haptic teaching input. The module 430 may be used to identify teacher intervention occurrence, e.g., determine a vector representing direction and speed in which the trainer may be moving the robot using a haptic action, and/or vectors of force/torque exerted by the trainer on the robotic body. The signal 432 may be configured based on the state vector data associated with the trainer intervention. The predictor module 430 may be operable in accordance with a learning process configured to calibrate the forward model in order to account for physical imperfections of the platform (e.g., friction, thermal effects, and/or other imperfections), external influences (e.g., wind, temperature changes, and/or other influences), and/or other factors. In some implementations, the predictor 430 learning process may be based on a supervised learning approach configured based on an actual state of the robot as the teaching signal. The teaching signal may comprise a sensory readings of relevant state variables of the platform 470 (e.g. platform velocity), and/or an estimate of the relevant state variables that may be determined based on sensory readings. In some implementations, the sensor may provide only images from a camera pointed towards the platform and estimation algorithms may be used to determine platform configuration and velocity from these images. The estimation algorithms may be embodied in module 420 or in 430.

The apparatus 400 may comprise an adaptive controller module 460 configured to determine the control signal 462. The controller module 460 may be operable in accordance with a control process configured based on the inferred teaching signal 432. In some implementations (not shown), the controller module 460 may be provided with the sensory input (e.g., 402) and/or the platform feedback (e.g., 474). The control process of the controller 460 may be configured to implement a dynamic model and a kinematic model of the robotic platform 470. In some implementations, the control process of the controller 460 may implement an inverse model configured to determine, e.g., a target actuator torque based on actual actuator position.

In one or more implementations, the control signal 462 may be interpreted as a correction for, e.g., the predicted motor control signal 442. The control signal 462 may be determined based on a discrepancy between the actual trajectory (e.g., 142 in FIG. 1) of the robotic device 400 and a target trajectory (e.g., 130) and may be determined based on the state information 422, 444 using, e.g., Eqn. 4.

Figure 4B:
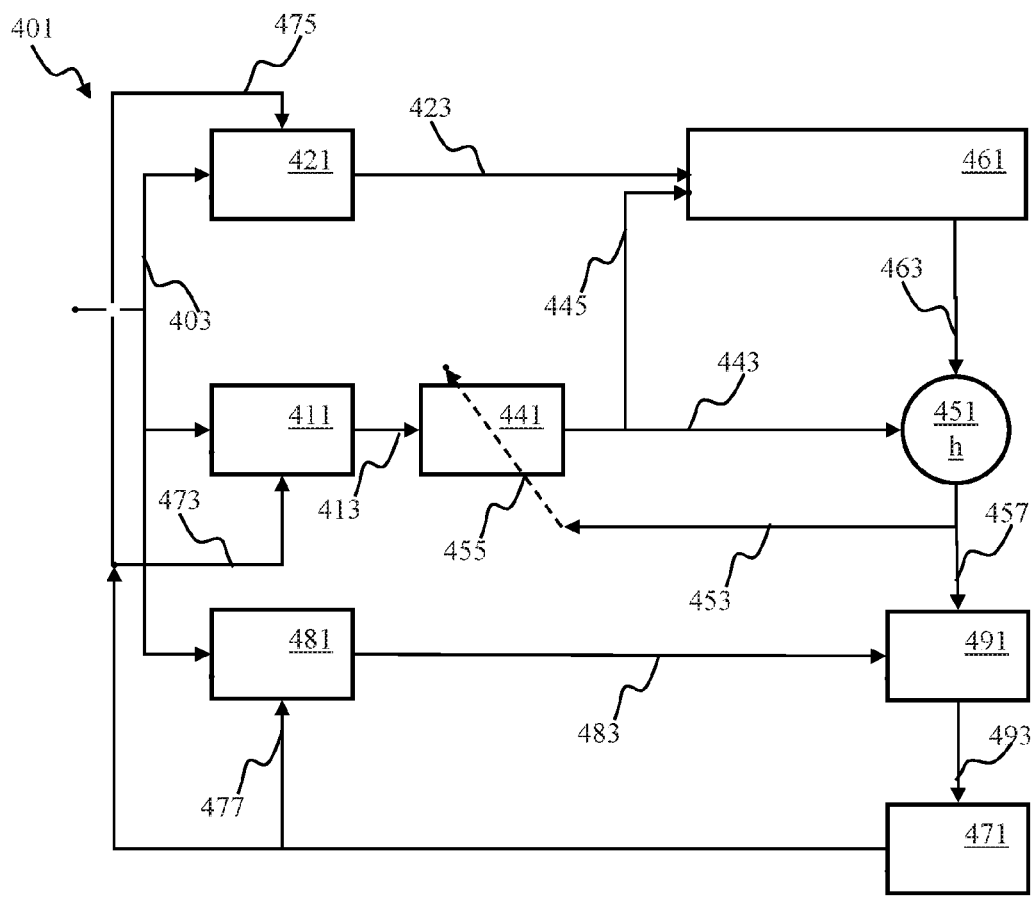
FIG. 4B is a functional block diagram illustrating an adaptive system comprising a feedback loop useful for determining a teaching input during haptic training, in accordance with one or more implementations.

FIG. 4B illustrates an adaptive system comprising a low level feedback loop useful for determining a teaching input during haptic training, in accordance with one or more implementations. The apparatus 401 of FIG. 4B may comprise a robotic platform 471 (e.g., a mobile rover, aerial vehicle, a manipulator, and/or other platform) configured to perform a target action based on the control signal 493. The control signal 493 may be configured to provide a torque to one or more actuators of the platform 471, in one or more implementation. The adaptive system 401 may receive sensory input 403 configured to convey information related to the robot's environment. The target task may be configured based on one or more objects (targets/obstacles) being present in the robot's environment.

The apparatus 401 may comprise one or more feature extractors 411, 421, 481. The feature extractor 411 may be configured to determine information related to one or more targets and/or obstacles using the sensory input 403 and/or a feedback 473 from the platform 471. The detected feature information 413 may comprise one or more of object position, size, color, platform position and/or other feature information.

The robotic platform 471 may comprise one or more controllable actuators, such as motorized joints, linear actuators, servomotors, stepper motors, transducers (e.g., electrical, mechanical, electromagnetic, chemical, acoustic and/or thermal), artificial limbs, and/or other components. In some implementations, the actuator may comprise low level control electronics configured to produce electrical, pneumatic, electromagnetic, and/or other signals configures to effectuate actuator operation (e.g., turn actuator gears and/or decode actuator feedback). Control of the platform actuator(s) may be implemented using a feedback loop methodology, in accordance with one or more implementations.

The system 401 may comprise a feedback controller 491 configured to implement the control feedback loop based on a set point methodology. The feedback controller may be configured to receive the set point information 457, conveying information about a target state of the platform. In one or more implementations, the set point information may convey a target position of the platform (e.g., position of the attachment 810 in FIG. 8), a target speed of the rover 960, a target height of an aerial vehicle, and/or other parameter. The feedback controller may be configured to receive actual state of the platform. In one or more implementations, the actual state information 483 may comprise actual platform position (e.g., position of the attachment 810 in FIG. 8), actual speed of the rover 960, actual height of an aerial vehicle, and/or other parameter. The actual state information 483 may be determined by the feature extractor 481 based on the sensory input 403 and/or feedback 477 from the platform 471. In some implementations, the platform feedback 477 may comprise sensory information provided by an actuator and/or its accompanying electronics (e.g., actuator with feedback) that may comprise actual actuator position, torque, current, and/or other parameter.

Based on the set point information (e.g., the target arm position) and the actual platform state (the actual arm position), the feedback controller 491 may determine actuator control output 493. In one or more implementations, the control output 493 may comprise actuator torque, motor current, transducer actuation force, and/or other. The control output may cause the platform to transition from the current state (e.g., the actual position) to a target state (e.g., the set point position).

The feedback controller 491, the platform 471 and the feature extractor 481 may form a low-level feedback loop wherein the feedback controller 491 may execute timely updates of the control signal based on a comparison between the target state (e.g., the set point) and the actual state. The feedback controller may be configured to implement a dynamic model of the platform 471 so as to relate the torque control signal to the target state (position). In some implementations, the feedback controller 491 may update the control signal 493 more frequently compared to the update rate of the target state information 457. By way of an illustration, for a given target position 457 of the platform (e.g., position set point), the controller 491 may issue several updates of the torque 493 in order to achieve the target position.

The module 491 may be operable in accordance with a learning process configured to calibrate the forward model in order to account, for example, for physical imperfections of the platform (e.g., friction, thermal effects, and/or other imperfections), external influences (e.g., wind, temperature changes, and/or other influences), and/or other factors.

The system 401 may further comprise an adaptive predictor 441 configured to determine a predicted target state signal 443 (e.g., a target position set point) in accordance with the context information 413. The predictor 441 may be operable in accordance with supervised learning process configured based on the teaching signal 455. The predicted control signal 443 may comprise a target state indication (e.g., a target position, speed, and/or other) in one or more implementations.

The system 401 may be operated using the haptic training approach described herein. Based on determining a discrepancy between the target state (e.g., target position) and actual state (e.g., position) of the platform, trainer may adjust the current state of the platform to match the target state. In some implementations of the control system 401 controlling a robotic manipulator (e.g., as shown and described with respect to FIG. 8) the trainer may displace a portion of the manipulator (e.g., the operational attachment 810 in FIG. 8) towards the target position using a physical contact with the manipulator.

The system 401 may comprise an adaptive controller module 461 configured to determine control signal 463. The modification by the trainer of the platform trajectory (e.g., via haptic action) may provide a teaching input to the controller module 461. The controller module 461 may configured to infer presence and/or magnitude of the teaching input based on the output of the predictor 441 received via the pathway 445, and the actual control state 423.

The feature extractor 421 may be configured to determine actual state of the robotic platform based on the sensory input 403 and/or platform feedback 475. The detected state 423 may comprise velocity of the platform 471 (e.g., rover velocity and/or limb velocity). In one or more implementations of haptic training, the actual state 421 of the platform 471 may be configured based on a teaching input due to one or more haptic actions e.g., as described above with respect to FIGS. 1-2.

In one or more implementations, the module 461 may incorporate a forward model of the platform 471 configured to relate one state parameter (e.g., the predicted actuator torque actuator torque $q^p$) to another state parameter (e.g., the predicted platform position $p^p$) as follows:

$$p^p = FM(q^p) \qquad \text{(Eqn. 5)}$$

In some implementations, the module 461 may be configured to implement an inverse model of the platform 471. The inverse model may be configured to determine a teaching input $c^t$ based on the actual platform state $p^a$ and the predicted state $p^p$:

$$c^t = IM(p^p, p^a) \qquad \text{(Eqn. 6)}$$

where $c^t$ denotes the inferred teaching input (e.g., position displacement) applied to the platform due to the haptic teaching input. The module 461 may be used to identify teacher intervention occurrence, e.g., determine a vector representing direction and speed in which the trainer may be moving the robot using the haptic action, and/or vectors of force/torque exerted by the trainer on the robotic body.

The controller module 461 may be operable in accordance with a control process configured based on the inferred teaching input. In some implementations, the controller module 461 may be provided with the sensory input (e.g., 403) and/or the platform feedback (e.g., 475). The control process of the controller 461 may be configured to implement a kinematic model of the robotic platform 471.

In some implementations, the control process of the controller module 461 may comprise a supervised learning approach configured based on a teaching signal. The teaching signal may comprise a displacement of the platform position due to the haptic action by the trainer. In some implementations, the teaching input may be configured based on sensory readings of relevant state variables of the platform 471 (e.g. platform position), and/or an estimate of the relevant state variables that may be determined based on sensory readings. The sensor input may comprise one or more images obtained using a camera disposed external to the platform 471 and pointed at the platform. Estimation algorithms may be used to determine platform configuration, position, and/or velocity using the camera output. The estimation algorithms may be embodied in module 421 and/or 461.

In one or more implementations, the control signal 463 may be interpreted as a correction for the predicted control signal 443. The control signal 463 may be determined based on a discrepancy between the actual trajectory (e.g., 142 in FIG. 1) of the robotic device 401 and a target trajectory (e.g., 130). The state discrepancy may be determined based on the state information 423, 445 using, e.g., Eqn. 4 and/or Eqn. 5-6.

The predicted control signal 443 may be combined with a control signal 463 by a combiner 451. The predictor and/or combiner may be operable using, for example, adaptive predictor methodology described in U.S. patent application Ser. No. 13/842,647 entitled "MULTICHANNEL ROBOTIC CONTROLLER APPARATUS AND METHODS", filed Mar. 15, 2013; and Ser. No. 13/842,583 entitled "APPARATUS AND METHODS FOR TRAINING OF ROBOTIC DEVICES", filed Mar. 15, 2013, incorporated supra. The output of the combiner 451 may be utilized to adapt the learning process of the predictor 441 via the teaching signal 455. In some implementations, the teaching signal 455 may comprise a combination of the predicted control signal 443 and the control signal 463.

Figure 5:
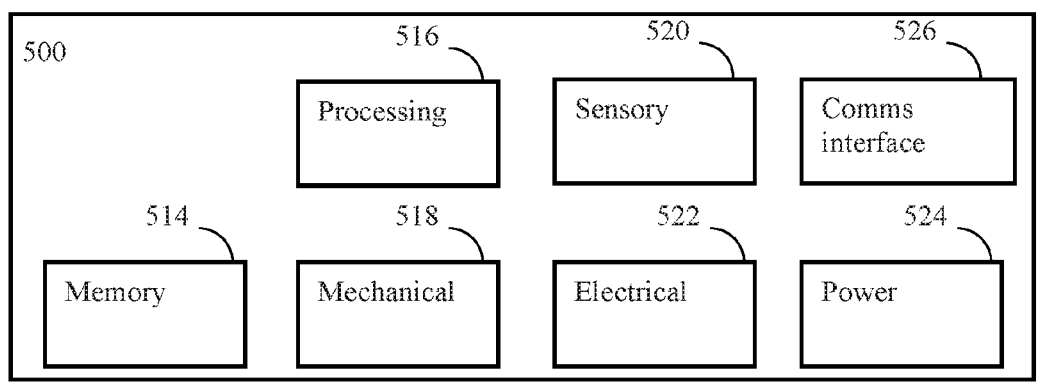
FIG. 5 is a functional block diagram illustrating a robotic controller apparatus for implementing, inter alia, online haptic learning methodology, in accordance with one or more implementations.

FIG. 5 is a functional block diagram illustrating a robotic controller apparatus for implementing, inter alia, haptic training methodology in accordance with one or more implementations.

Figure 9:
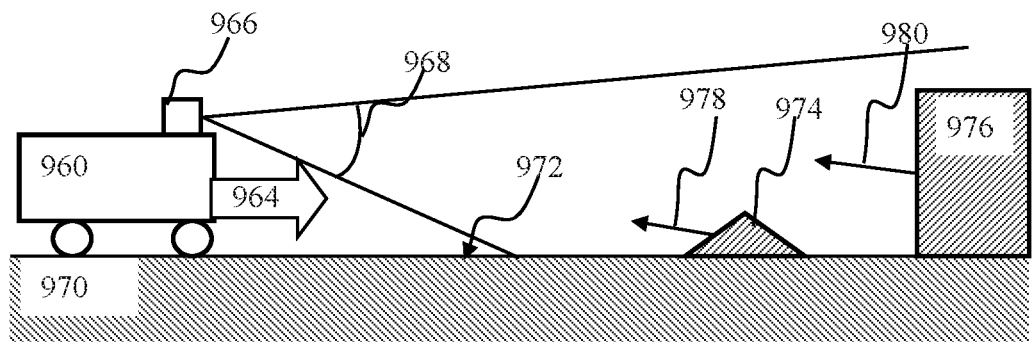
FIG. 9 is a graphical illustration depicting robotic apparatus comprising an adaptive controller apparatus of the disclosure configured for obstacle avoidance using haptic learning methodology, in accordance with one or more implementations.

The apparatus 500 may comprise a processing module 516 configured to receive sensory input from sensory block 520 (e.g., camera 966 in FIG. 9). In some implementations, the sensory module 520 may comprise audio input/output portion. The processing module 516 may be configured to implement signal processing functionality (e.g., object detection).

The apparatus 500 may comprise memory 514 configured to store executable instructions (e.g., operating system and/or application code, raw and/or processed data such as raw image frames and/or object views, teaching input, information related to one or more detected objects, and/or other information).

In some implementations, the processing module 516 may interface with one or more of the mechanical 518, sensory 520, electrical 522, power components 524, communications interface 526, and/or other components via driver interfaces, software abstraction layers, and/or other interfacing techniques. Thus, additional processing and memory capacity may be used to support these processes. However, it will be appreciated that these components may be fully controlled by the processing module. The memory and processing capacity may aid in processing code management for the apparatus 500 (e.g. loading, replacement, initial startup and/or other operations). Consistent with the present disclosure, the various components of the device may be remotely disposed from one another, and/or aggregated. For example, the instructions operating the haptic learning process may be executed on a server apparatus that may control the mechanical components via network or radio connection. In some implementations, multiple mechanical, sensory, electrical units, and/or other components may be controlled by a single robotic controller via network/radio connectivity.

The mechanical components 518 may include virtually any type of device capable of motion and/or performance of a desired function or task. Examples of such devices may include one or more of motors, servos, pumps, hydraulics, pneumatics, stepper motors, rotational plates, micro-electro-mechanical devices (MEMS), electroactive polymers, shape memory alloy (SMA) activation, and/or other devices. The sensor devices may interface with the processing module, and/or enable physical interaction and/or manipulation of the device.

The sensory devices 520 may enable the controller apparatus 500 to accept stimulus from external entities. Examples of such external entities may include one or more of video, audio, haptic, capacitive, radio, vibrational, ultrasonic, infrared, motion, and temperature sensors radar, lidar and/or sonar, and/or other external entities. The module 516 may implement logic configured to process user queries (e.g., voice input "are these my keys") and/or provide responses and/or instructions to the user. The processing associated with sensory information is discussed with respect to FIG. 5.

The electrical components 522 may include virtually any electrical device for interaction and manipulation of the outside world. Examples of such electrical devices may include one or more of light/radiation generating devices (e.g. LEDs, IR sources, light bulbs, and/or other devices), audio devices, monitors/displays, switches, heaters, coolers, ultrasound transducers, lasers, and/or other electrical devices. These devices may enable a wide array of applications for the apparatus 500 in industrial, hobbyist, building management, medical device, military/intelligence, and/or other fields.

The communications interface may include one or more connections to external computerized devices to allow for, inter alia, management of the apparatus 500. The connections may include one or more of the wireless or wireline interfaces discussed above, and may include customized or proprietary connections for specific applications. The communications interface may be configured to receive sensory input from an external camera, a user interface (e.g., a headset microphone, a button, a touchpad, and/or other user interface), and/or provide sensory output (e.g., voice commands to a headset, visual feedback, and/or other sensory output).

The power system 524 may be tailored to the needs of the application of the device. For example, for a small hobbyist robot or aid device, a wireless power solution (e.g. battery, solar cell, inductive (contactless) power source, rectification, and/or other wireless power solution) may be appropriate. However, for building management applications, battery backup/direct wall power may be superior, in some implementations. In addition, in some implementations, the power system may be adaptable with respect to the training of the apparatus 500. Thus, the apparatus 500 may improve its efficiency (to include power consumption efficiency) through learned management techniques specifically tailored to the tasks performed by the apparatus 500.

Figure 6:
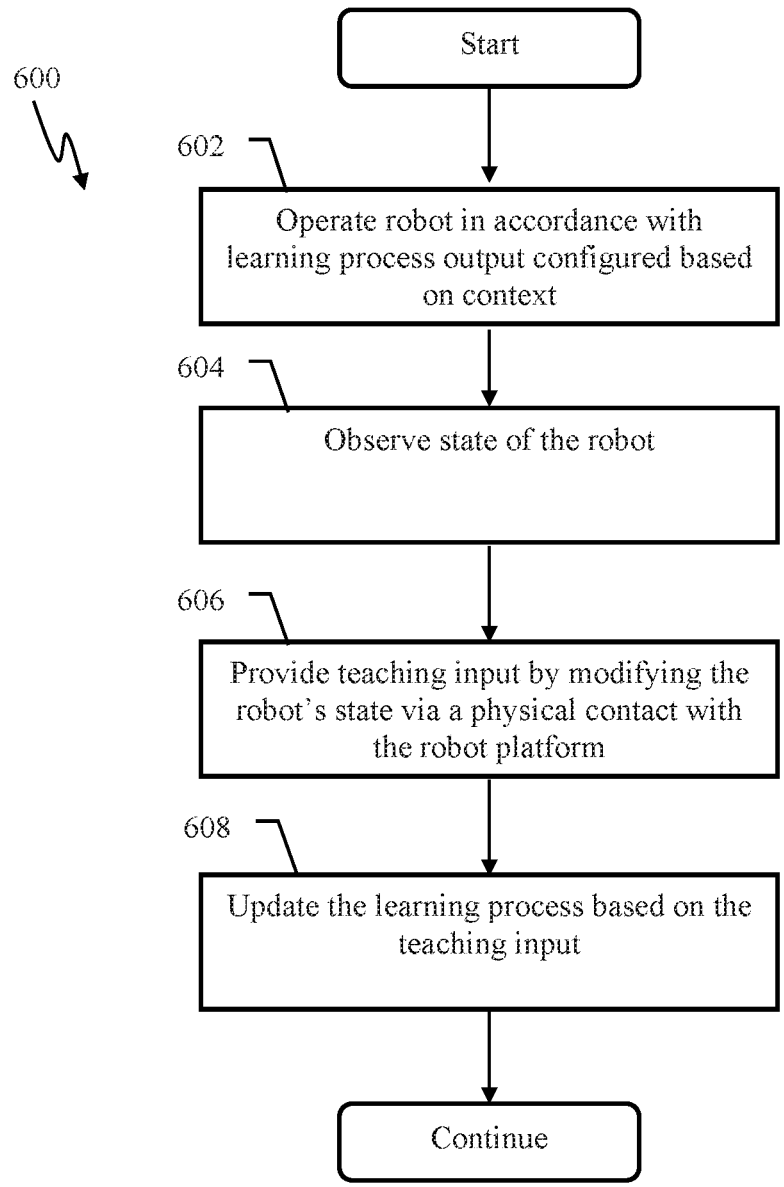
FIG. 6 is logical flow diagram illustrating a method of haptic training of a robotic device, in accordance with one or more implementations.
Figure 7:
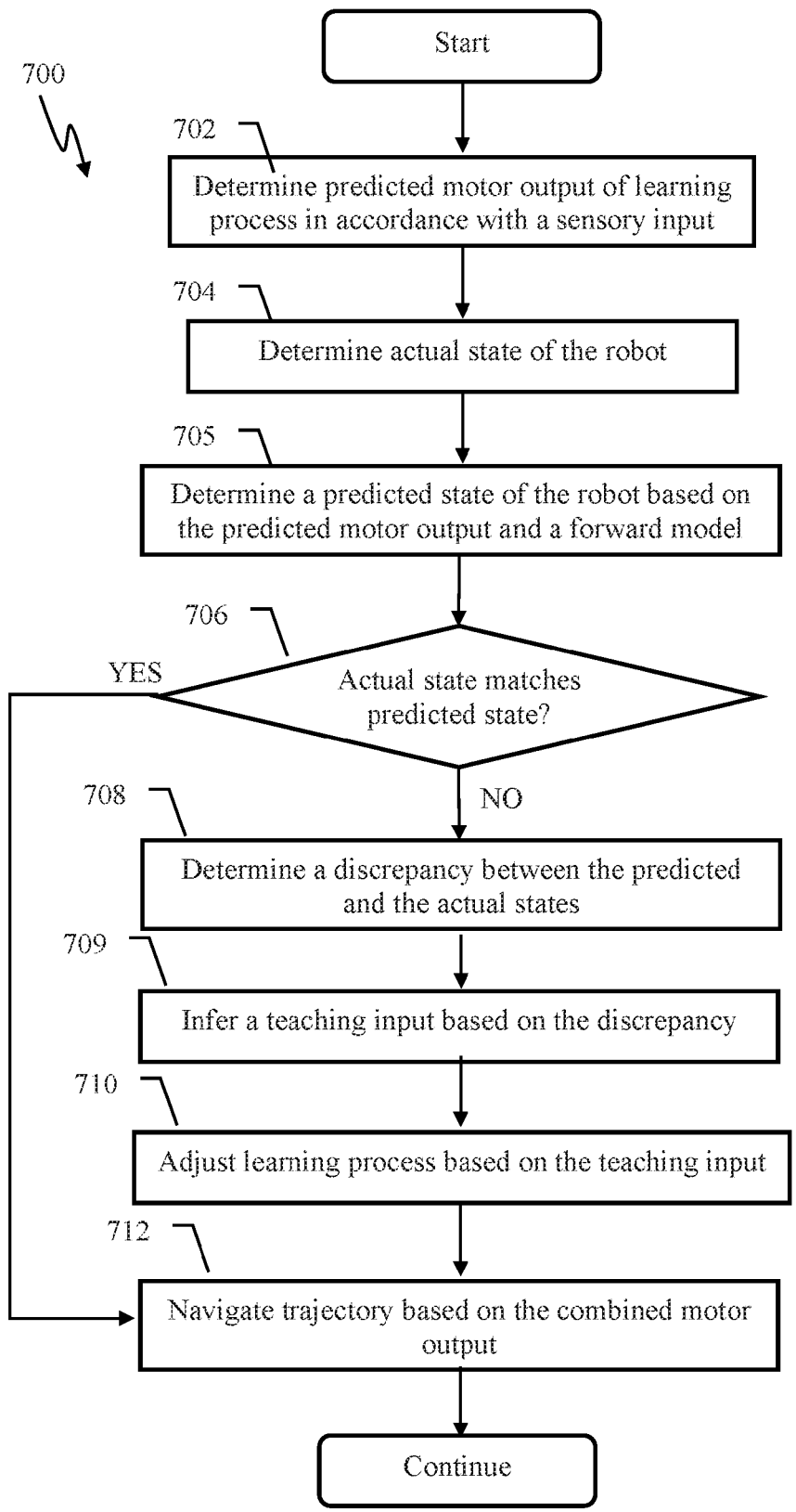
FIG. 7 is logical flow diagram illustrating a method of operating a robotic device using haptic learning methodology, in accordance with one or more implementations.

FIGS. 6 and 7 illustrate methods 600, 700 of operating robotic devices utilizing the haptic training methodology of the disclosure. The operations of methods 600, 700 presented below are intended to be illustrative. In some implementations, method 600, 700 may be accomplished with one or more additional operations not described, and/or without one or more of the operations discussed. Additionally, the order in which the operations of method 600, 700 are illustrated in FIGS. 6 and 7 and described below is not intended to be limiting.

In some implementations, methods 600, 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600, 700 in response to instructions stored electronically on an electronic storage medium. The one or more processing devices may include one or more devices configured through hardware, firmware, and/or software to be specifically designed for execution of one or more of the operations of methods 600, 700. FIG. 6 illustrates a method of haptic training of a robotic device, in accordance with one or more implementations. In one or more implementations, the training may be effectuated by a trainer comprising a human operator and/or a computerized agent. Training of method 600 may be based on multiple iterations (e.g., the trials 124, 126 in FIG. 1) wherein during a given iteration the robot may be configured to navigate a trajectory (e.g., the trajectory 130 in FIG. 1).

At operation 602 of method 600, a context may be determined. In some implementations, the context may comprise one or more aspects of sensory input (e.g., 302 in FIG. 3 described above and/or 1002 of FIG. 10, described below) and/or feedback that may be provided by robot platform to the controller. In one or more implementations, the sensory aspects may include an object being detected in the input, a location of the object, an object characteristic (color/shape), a sequence of movements (e.g., a turn), a characteristic of an environment (e.g., an apparent motion of a wall and/or other surroundings turning a turn and/or approach) responsive to the movement. In some implementation, the sensory input may be received based on performing one or more training trials of the robotic apparatus.

At operation 602 the robot may be operated in accordance with an output determined by a learning process of the robot based on the context. In some implementations, the context may comprise location of objects 132, 134 in FIG. 1. The output may comprise a control command to one or more actuators of the rover 110 configured to execute right turn. The operation 602 may be characterized by a trajectory of the robot, e.g., 142 in FIG. 1.

At operation 604 state of the robot may be observed by the trainer. In one or more implementation, the state may comprise position of the rover along the trajectory (e.g., at location 144 if the trajectory 142 in FIG. 1), orientation and/or velocity of a manipulator, and/or other parameters. Based on the robot state observation at operation 604, the trainer may determine that the actual robot state does not match the target state (e.g., the actual trajectory location 144 does not match the target trajectory location 146 in FIG. 1).

At operation 606 a teaching input may be provided to the robot by the trainer modifying the robot's state via physical contact (e.g., a haptic action) with the robot platform. In some implementations, the haptic action may comprise one or more of a push, a pull, a movement (e.g., pick up and move, move forward, backwards, rotate, rich for an object, pick up, grasp, manipulate, release, and/or other movements), a bump, moving the robot or a portion thereof along a target trajectory, holding the robot in place, and/or other physical interaction of the trainer with the robot. In one or more implementations of training a manipulator arm, the haptic action may comprise the trainer grabbing and moving the arm along the target trajectory.

At operation 608, the learning process of the robot may be updated based on the training input due to the haptic action. In one or more implementations, the learning process may comprise a supervised learning process configured based on the teaching signal. The teaching signal may be inferred based on a comparison of the robot's actual state with a predicted state using, e.g., methodologies described above with respect to FIGS. 2-4B. At a subsequent time instance (e.g., from the location 146 to the target 140 in FIG. 1), the robot may be operated in accordance with the output of the updated learning process.

FIG. 7 illustrates a method of operating a robotic device using haptic learning methodology, in accordance with one or more implementations.

At operation 702 in accordance with a sensory input, a predicted motor output may be determined by a learning process of the robotic device. In one or more implementations, such as object recognition and/or obstacle avoidance, the input of operation 702 may comprise a stream of pixel values associated with one or more digital images. In one or more implementations (e.g., video, radar, sonography, x-ray, magnetic resonance imaging, and/or other types of sensing), the input may comprise electromagnetic waves (e.g., visible light, IR, UV, and/or other types of electromagnetic waves) entering an imaging sensor array. In some implementations, the imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present technology. Pixels and/or groups of pixels associated with objects and/or features in the input frames may be encoded using, for example, latency encoding described in commonly owned and co-pending U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, entitled "SYSTEMS AND METHODS FOR INVARIANT PULSE LATENCY CODING"; U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, encoding may comprise adaptive adjustment of neuron parameters, such neuron excitability described in commonly owned and co-pending U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

The sensory input of operation 702 may comprise data used for solving a particular control task. For example, the sensory input signal may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as those involving object recognition, the sensory input may comprise an array of pixel values in the input image, or preprocessed data. Preprocessed data may include data conveying information associated with one or more of levels of activations of Gabor filters for face recognition, contours, and/or other information. In one or more implementations, the sensory input may comprise a target motion trajectory, and/or state of the robotic platform (e.g., joint orientation, motor current draw, torque, force, acceleration, and/or other parameters useful for determining platform configuration, position and/or motion characteristics). In one or more implementations, the predicted output may comprise the adaptive predictor output 342, 442 in FIG. 3, 4 described above.

At operation 704, actual state of the robot may be determined. In one or more implementations, the actual state determination may comprise evaluating one or more sensory inputs (e.g., joint orientation, motor current draw, torque, force, acceleration, and/or other parameters) obtained at operation 702.

At operation 705, a predicted state of the robot may be determined. In one or more implementations, the predicted state determination may be configured based on a forward model configured to predict state of the robot (e.g., joint orientation) based on a motor output (e.g., current applied to the joint motor) determined at operation 702. The forward model operation may be based on any applicable methodologies described herein (e.g., a LUT, a component decomposition, an ANN, and/or other).

At operation 706 a determination may be made as to whether the actual state matches the predicted state. In one or more implementations, the predicted state may be configured based on the robot navigating the target trajectory in accordance with the predicted motor output (e.g., 342, 442 in FIGS. 3, 4A).

Responsive to a determination at operation 706 that the actual state does not match the target state, the method may proceed to operation 708 wherein a discrepancy between the predicted state and actual state may be determined. Various approaches may be utilized in order to determine discrepancy. In one or more implementations, a distance measure, a norm, a maximum absolute deviation, a signed/unsigned difference, a correlation, and/or a function of an n-dimensional distance may be utilized.

At operation 709 a teaching input into the robot learning process may be determined. In some implementations, the teaching input may be inferred based on the discrepancy. In one or more implementations, the teaching input may comprise a motor command correction (e.g., 362, 462 in FIGS. 3, 4A). The teaching input determination may be based on any applicable methodologies including interpolation, extrapolation and/or other.

At operation 710 the learning process may be adjusted based on the teaching input determined at operation 709. The learning process may comprise a supervised learning process configured to be adjusted based on a teaching input comprised of a prior motor control output and the motor command correction (e.g., the combiner output 354, 454 in FIGS. 3, 4A). The learning process adjustment may be configured to adjust the actual trajectory of the robotic device during one or more subsequent training trials (e.g., the trajectory 152 of the trial 126 in FIG. 1).

Responsive to a determination at operation 706 that the actual state matches the target state, the method may proceed to operation 712, wherein the trajectory may be navigated based on a combined control output (e.g., 356, 456 in FIGS. 3, 4A) comprising the predicted motor control output and the correction.

The haptic learning methodology described herein is characterized by absence of record/replay phases of robot operation. In accordance with the principles of the present disclosure, at a given time instance, the robot may navigate a trajectory autonomously (e.g., based on an internally determined control signal (e.g., 342, 442 in FIGS. 3, 4A)). When the teaching input is present (e.g., due to a haptic push/pull action by the trainer), the trajectory of the robot may be modified so as to execute an action based on both the internal control signal and the correction signal (e.g., 362, 462 in FIGS. 3, 4A) due to trainer input. The correction signal may be inferred by the controller based on an evaluation of a predicted and an actual state of the robot using, e.g., a forward model configured to predict a state parameter of the robot corresponding to execution of the internal control signal. In some implementations, the evaluation may be based on a comparison, an n-dimensional (n≥1) distance measure determination in the state apace of the robotic device, a correlation, and/or other operation. The forward model determination module may be pre-configured and/or learned during the training. The forward model learning may comprise a supervised learning process configured based on an actual state of the robot as the teaching signal. The use of learning may enable FM adjustment (e.g., calibration) responsive to changes in the robot platform (e.g., due to friction, thermal effects, and/or other) and/or environment (e.g., wind, temperature, pressure changes, and/or other) during operation of the robot. In some implementations, a generic FM may be calibrated through learning for a given individual body of the robot thereby improving performance of the robot. The actual state of the robot may be determined using visual feedback (e.g., joint position), motor actuator feedback (e.g., torque, position, current draw), and/or other.

The controller configuration, e.g., comprising the combiner module 350, 450 illustrated in FIGS. 3-4A, may enable action execution due to contemporaneous application of the teaching correction and the autonomously generated control signals. The correction may be provided to the internal control signal predictor module so as to modify its learning process and to adjust subsequent control signal predictions.

In some implementations, the robot may be configured to autonomously sense and/or infer teaching correction during trajectory navigation in absence of additional indications/teaching clues. In one or more implementations, the robot may be configured to detect a teaching signal indication in sensory input (e.g., appearance of trainer hands proximate a manipulator arm). Such implementations may facilitate teaching input inference in presence of external factors (e.g., obstacles, environmental changes) that may affect the robot trajectory.

Figure 8:
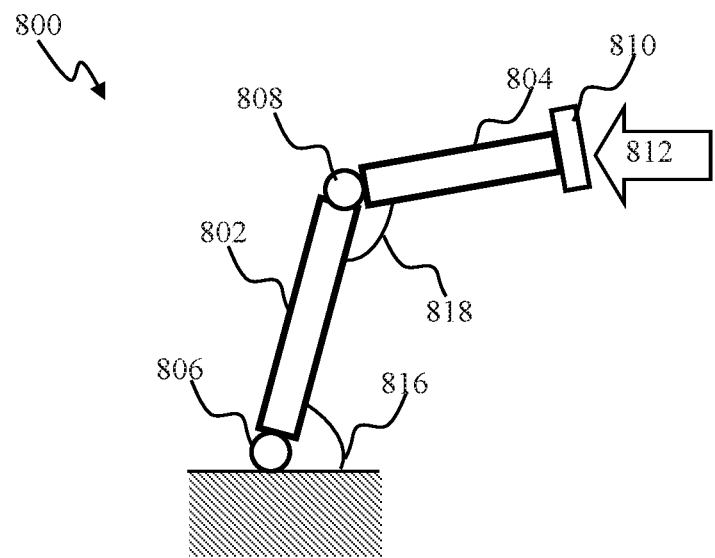
FIG. 8 is a graphical illustration depicting a robotic apparatus comprising a multi-joint manipulator useful with the haptic training methodology, in accordance with one or more implementations.

Haptic training methodology described herein may be utilized for implementing adaptive controllers of robotic devices. FIG. 8 depicts a robotic manipulator apparatus 800 that may be operably coupled to an adaptive controller, e.g., one or more controller implementations illustrated in FIGS. 1-5, supra. The robotic apparatus 800 may comprise multiple segments 802, 804 coupled to joints 806, 808. The apparatus 800 may be characterized by multiple degrees of freedom, e.g., angles 816, 818 of the segments 802, 804, respectively, as shown in the implementation of FIG. 8. The controller (not shown) of the apparatus 800 may be operable in accordance with a learning process configured to adjust angles 816, 818 in order to perform a target task (e.g., to position the attachment functional attachment 810 at a target position). The learning process of the controller may be trained using the online haptic training methodology described herein. During online haptic training of the apparatus 800 controller, a trainer may adjust operational trajectory of the apparatus 800 in real time. The operational trajectory may be characterized by one or more state parameters associated with the apparatus 800. In one or more implementations, the state parameters may comprise segment angles 816, 818, positions of actuators of joints 816, 818, actuator torque, current draw, position of the attachment 810, and/or other parameters.

By way of a non-limiting illustration, upon observing a discrepancy between current position of the attachment 810 and a target position, the trainer may use a physical contact (e.g., depicted by arrow 812 in FIG. 8) in order to displace the attachment 810 to the target position. In some implementations, the haptic action 812 may cause changes in the in multiple state parameters (e.g., the angle 816 may change contemporaneously with the angle 818). The controller may be configured to detect occurrence of the trajectory displacement due to the interference by the trainer (e.g., the haptic action 812). In some implementations, the trainer's interference may be determined based on an evaluation of a current state of the apparatus 800 (e.g., the angles 816, 818) and a predicted state. The learning process of the controller may comprise a supervised learning process that may be updated using a training signal inferred from the state evaluation using, e.g., methodology described with respect to FIG. 7 above.

FIG. 9 depicts a mobile robotic apparatus that may be configured with an adaptive controller in accordance with one or more implementations illustrated in FIGS. 1-5, supra. The robotic apparatus 960 may comprise a camera 966. The camera 966 may be characterized by a field of view 968 (e.g., an extent of the observable world that may be captured by the camera lens at a given moment). The camera 966 may provide information associated with objects within the field-of-view. In some implementations, the camera 966 may provide frames of pixels of luminance, refreshed at 25 Hz frame rate. However, it will be appreciated that, in some implementations, other frame rates may be used (whether constant or variable).

One or more objects (e.g., a floor 970, a stationary object 974, a moving object 976, and/or other objects) may be present in the camera field of view. The motion of the objects may result in a displacement of pixels representing the objects within successive frames, such as described in co-owned U.S. patent application Ser. No. 13/689,717 filed on Nov. 20, 2012 and entitled "APPARATUS AND METHODS FOR OBJECT DETECTION VIA OPTICAL FLOW CANCELLATION", issued as U.S. Pat. No. 9,047,568 on Jun. 2, 2015 and incorporated by reference in its entirety.

When the robotic apparatus 960 is in motion, such as shown by arrow 964 in FIG. 9, the optical flow estimated from the image data may comprise the self-motion component and the object motion component. By way of a non-limiting example, the optical flow measured by the rover of FIG. 9 may comprise one or more of (i) self-motion components of the stationary object 978 and the boundary (e.g., the component 972 associated with the floor boundary); (ii) component 980 associated with the moving objects 976 that comprises a superposition of the optical flow components due to the object displacement and displacement of the robotic apparatus; and/or other components.

One approach to object recognition and/or obstacle avoidance may comprise processing of optical flow using a spiking neural network apparatus comprising for example the self-motion cancellation mechanism, such as described, for example, in co-owned U.S. patent application Ser. No. 13/689,717 filed on Nov. 20, 2012 and entitled "APPARATUS AND METHODS FOR OBJECT DETECTION VIA OPTICAL FLOW CANCELLATION", issued as U.S. Pat. No. 9,047,568 on Jun. 2, 2015, the foregoing being incorporated supra.

FIG. 10 illustrates a processing apparatus configured to implement object recognition and/or obstacle avoidance and useful with an adaptive controller of a robotic device of FIG. 9. The illustrated processing apparatus 1000 may comprise an input interface configured to receive an input sensory signal 1002. In some implementations, this sensory input may comprise electromagnetic waves (e.g., visible light, IR, UV, and/or other types of electromagnetic waves) entering an imaging sensor array. The imaging sensor array may comprise one or more of retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, grayscale, and/or other representations) and/or frame rates (whether regular or aperiodic) are equally useful with the present disclosure.

The apparatus 1000 may be embodied in, for example, an autonomous robotic device, e.g., the device 960 of FIG. 9.

The apparatus 1000 may comprise an encoder 1010 configured to transform (e.g., encode) the input signal 1002 into an encoded signal 1026. In some implementations, the encoded signal may comprise a plurality of pulses (also referred to as a group of pulses) configured to represent the optical flow due to one or more objects in the vicinity of the robotic device.

The encoder 1010 may receive signal 1004 representing motion of the robotic device. In one or more implementations, the input 1004 may comprise an output of an inertial sensor module. The inertial sensor module may comprise one or more acceleration sensors and/or acceleration rate of change (i.e., rate) sensors. In one or more implementations, the inertial sensor module may comprise a 3-axis accelerometer, 3-axis gyroscope, and/or other inertial sensor. It will be appreciated by those skilled in the arts that various other motion sensors may be used to characterized motion of a robotic platform, such as, for example, radial encoders, range sensors, global positioning system (GPS) receivers, RADAR, SONAR, LIDAR, and/or other sensors.

The encoder 1010 may comprise one or more spiking neurons. One or more of the spiking neurons of the module 1010 may be configured to encode motion input 1004. One or more of the spiking neurons of the module 1010 may be configured to encode input 1002 into optical flow, as described in co-owned U.S. patent application Ser. No. 13/689,717 filed on Nov. 20, 2012 and entitled "APPARATUS AND METHODS FOR OBJECT DETECTION VIA OPTICAL FLOW CANCELLATION", issued as U.S. Pat. No. 9,047,568 on Jun. 2, 2015, incorporated supra.

The encoded signal 1026 may be communicated from the encoder 1010 via multiple connections (also referred to as transmission channels, communication channels, or synaptic connections) 1044 to one or more neuronal nodes (also referred to as the detectors) 1042.

In one or more implementations such as those represented by FIG. 10, individual detectors of the same hierarchical layer may be denoted by a "n" designator, such that, e.g., the designator 1042_1 denotes the first detector of the layer 1042. Although only two detectors (1042_1, 1042_n) are shown in FIG. 10 for clarity, it will be appreciated that the encoder may be coupled to any number of detector nodes that is compatible with the detection apparatus hardware and software limitations. Furthermore, a single detector node may be coupled to any practical number of encoders.

In various implementations, individual detectors 1042_1, 1042_n may contain logic (which may be implemented as a software code, hardware logic, and/or a combination of thereof) configured to recognize a predetermined pattern of pulses in the encoded signal 1026 to produce post-synaptic detection signals transmitted over communication channels 1048. Such recognition may include one or more mechanisms described in one or more of U.S. patent application Ser. No. 12/869,573 filed on Aug. 26, 2010 and entitled "SYSTEMS AND METHODS FOR INVARIANT PULSE LATENCY CODING"; U.S. patent application Ser. No. 12/869,583 filed on Aug. 26, 2010 and entitled "INVARIANT PULSE LATENCY CODING SYSTEMS AND METHODS"; U.S. patent application Ser. No. 13/117,048 filed on May 26, 2011 and entitled "APPARATUS AND METHODS FOR POLYCHRONOUS ENCODING AND MULTIPLEXING IN NEURONAL PROSTHETIC DEVICES"; and/or U.S. patent application Ser. No. 13/152,084 filed Jun. 2, 2011 and entitled "APPARATUS AND METHODS FOR PULSE-CODE INVARIANT OBJECT RECOGNITION"; each of the foregoing incorporated herein by reference in its entirety. In FIG. 10, the designators 1048_1, 1048_n denote output of the detectors 1042_1, 1042_n, respectively.

In some implementations, the detection signals may be delivered to a next layer of detectors 1052 (comprising detectors 1052_1, 1052_m, 1052_k) for recognition of complex object features and objects, similar to the exemplary implementation described in commonly owned and co-pending U.S. patent application Ser. No. 13/152,084 filed on Jun. 2, 2011 and entitled "APPARATUS AND METHODS FOR PULSE-CODE INVARIANT OBJECT RECOGNITION", incorporated supra. In some implementations, individual subsequent layers of detectors may be configured to receive signals (e.g., via connections 1058) from the previous detector layer, and to detect more complex features and objects (as compared to the features detected by the preceding detector layer). For example, a bank of edge detectors may be followed by a bank of bar detectors, followed by a bank of corner detectors and so on, thereby enabling recognition of one or more letters of an alphabet by the apparatus.

Individual detectors 1042 may output detection (post-synaptic) signals on communication channels 1048_1, 1048_n (with an appropriate latency) that may propagate with appropriate conduction delays to the detectors 1052. In some implementations, the detector cascade shown in FIG. 10 may contain any practical number of detector nodes and detector banks determined, inter alia, by the software/hardware resources of the detection apparatus and complexity of the objects being detected.

The exemplary sensory processing apparatus 1000 illustrated in FIG. 10 may further comprise one or more lateral connections 1046, configured to provide information about activity of neighboring neurons to one another.

In some implementations, the apparatus 1000 may comprise feedback connections 1006, 1056, which may be configured to communicate context information from detectors within one hierarchy layer to previous layers, as illustrated by the feedback connections 1056_1, 1056_2 in FIG. 10. In some implementations, the feedback connection 1006 may be configured to provide feedback to the encoder 1010 thereby facilitating sensory input encoding, as described in detail in commonly owned and co-pending U.S. patent application Ser. No. 13/152,084 filed on Jun. 2, 2011 and entitled "APPARATUS AND METHODS FOR PULSE-CODE INVARIANT OBJECT RECOGNITION", incorporated supra.

Output 1050 of the processing apparatus 1000 may be provided via one or more connections 1058.

Various exemplary computerized apparatus configured to operate a neuron network configured to implement haptic learning methodology set forth herein are now described in connection with FIGS. 11A-11D.

Figure 11A:
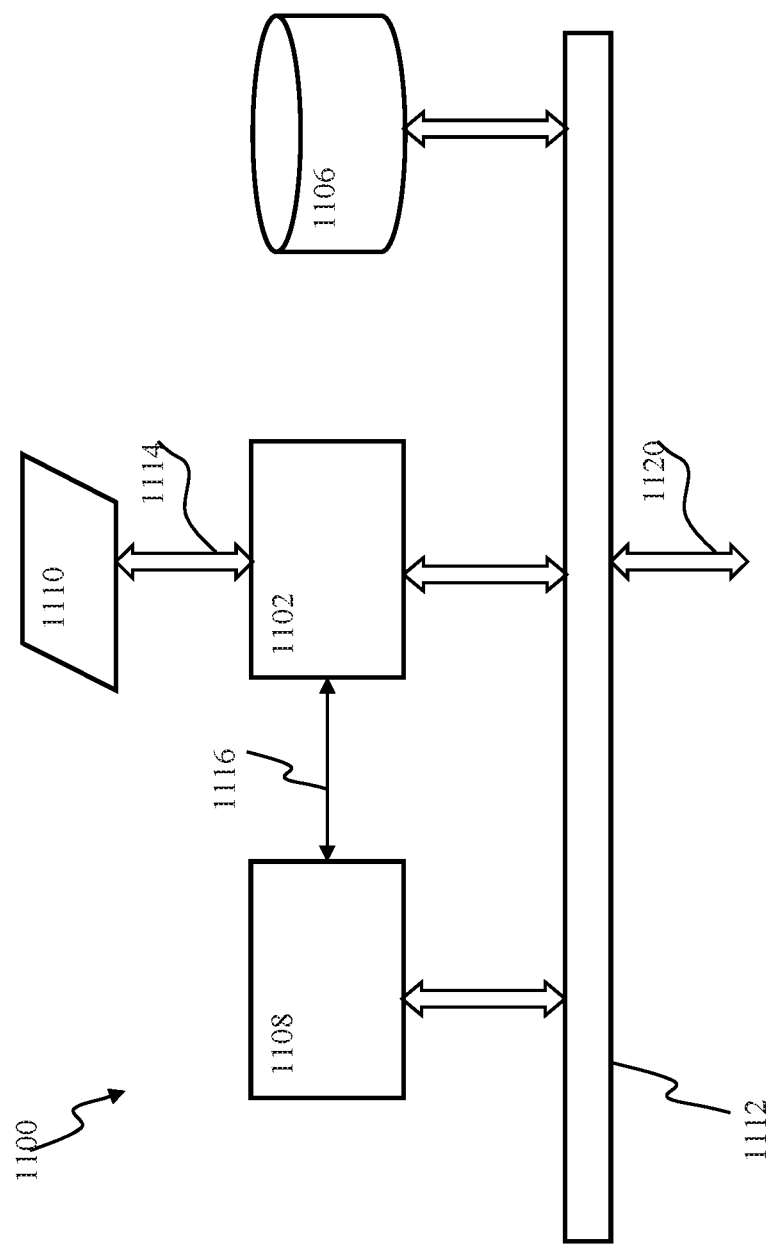
FIG. 11A is a block diagram illustrating a computerized system useful for, inter alia, operating a robotic controller configured using haptic learning methodology, in accordance with one or more implementations.

A computerized neuromorphic processing system, consistent with one or more implementations, for use with an adaptive robotic controller described, supra, is illustrated in FIG. 11A. The computerized system 1100 of FIG. 11A may comprise an input device 1110, such as, for example, an image sensor and/or digital image interface. The input interface 1110 may be coupled to the processing module (e.g., a single or multi-processor module) via the input communication interface 1114. In some implementations, the interface 1114 may comprise a wireless interface (e.g., cellular wireless, Wi-Fi, Bluetooth, and/or other wireless interface) that enables data transfer to the processor 1102 from remote I/O interface 1100. One such implementation may comprise a central processing apparatus coupled to one or more remote camera devices providing sensory input to the pre-processing module (e.g., described with respect to operation 314 in FIG. 3).

The system 1100 further may comprise a random access memory (RAM) 1108, configured to store neuronal states and connection parameters and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety.

In some implementations, the memory 1108 may be coupled to the processor 1102 via a direct connection 1116 (e.g., memory bus). The memory 1108 may also be coupled to the processor 1102 via a high-speed processor bus 1112.

The system 1100 may comprise a nonvolatile storage device 1106. The nonvolatile storage device 1106 may comprise, inter alia, computer readable instructions configured to implement various aspects of neuronal network operation. Examples of various aspects of neuronal network operation may include one or more of sensory input encoding, connection plasticity, operation model of neurons, learning rule evaluation, other operations, and/or other aspects. In one or more implementations, the nonvolatile storage 1106 may be used to store state information of the neurons and connections for later use and loading previously stored network configuration. The nonvolatile storage 1106 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processing entities (e.g., computing clusters and/or cloud computing services). Various user input/output interfaces may be similarly applicable to implementations of the disclosure including, for example, an LCD/LED monitor, touch-screen input and display device, speech input device, stylus, light pen, trackball, and/or other devices.

Figure 11B:
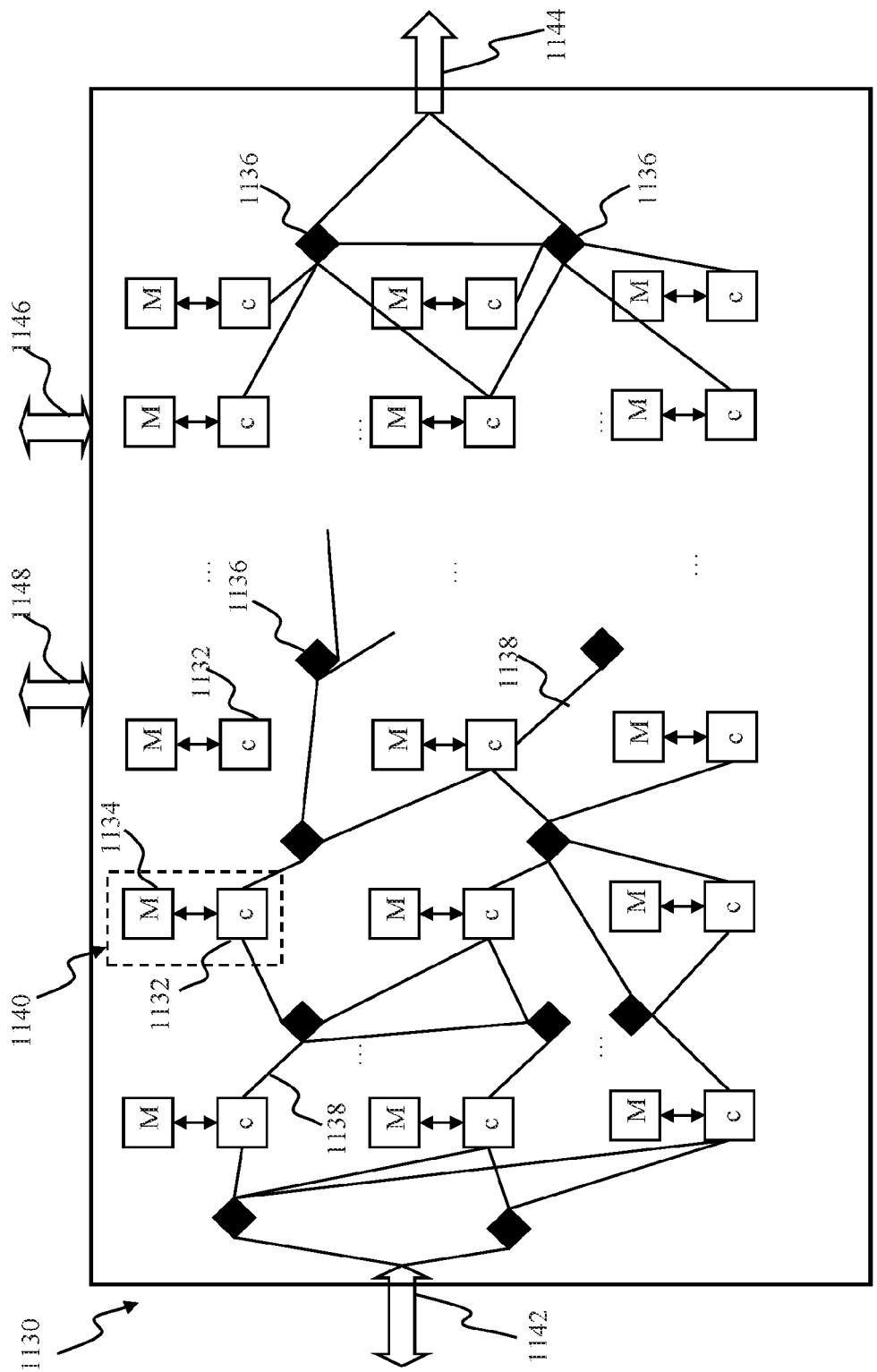
FIG. 11B is a block diagram illustrating a cell-type neuromorphic computerized system useful with, inter alia, haptic learning methodology of the disclosure, in accordance with one or more implementations.

Referring now to FIG. 11B, one implementation of neuromorphic computerized system configured to implement haptic learning mechanisms using a parallel network is described in detail. The neuromorphic processing system 1130 of FIG. 11B may comprise a plurality of processing blocks (micro-blocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, and retargeting, and/or other operations. Network node and connection information for a current task may be saved for future use and flushed. Previously stored network configuration may be loaded in place of the network node and connection information for the current task, as described for example in co-pending and co-owned U.S. patent application Ser. No. 13/487,576 filed on Jun. 4, 2012 and entitled "DYNAMICALLY RECONFIGURABLE STOCHASTIC LEARNING APPARATUS AND METHODS", which is incorporated herein by reference in its entirety. External memory may include one or more of a Flash drive, a magnetic drive, and/or other external memory.

Figure 11C:
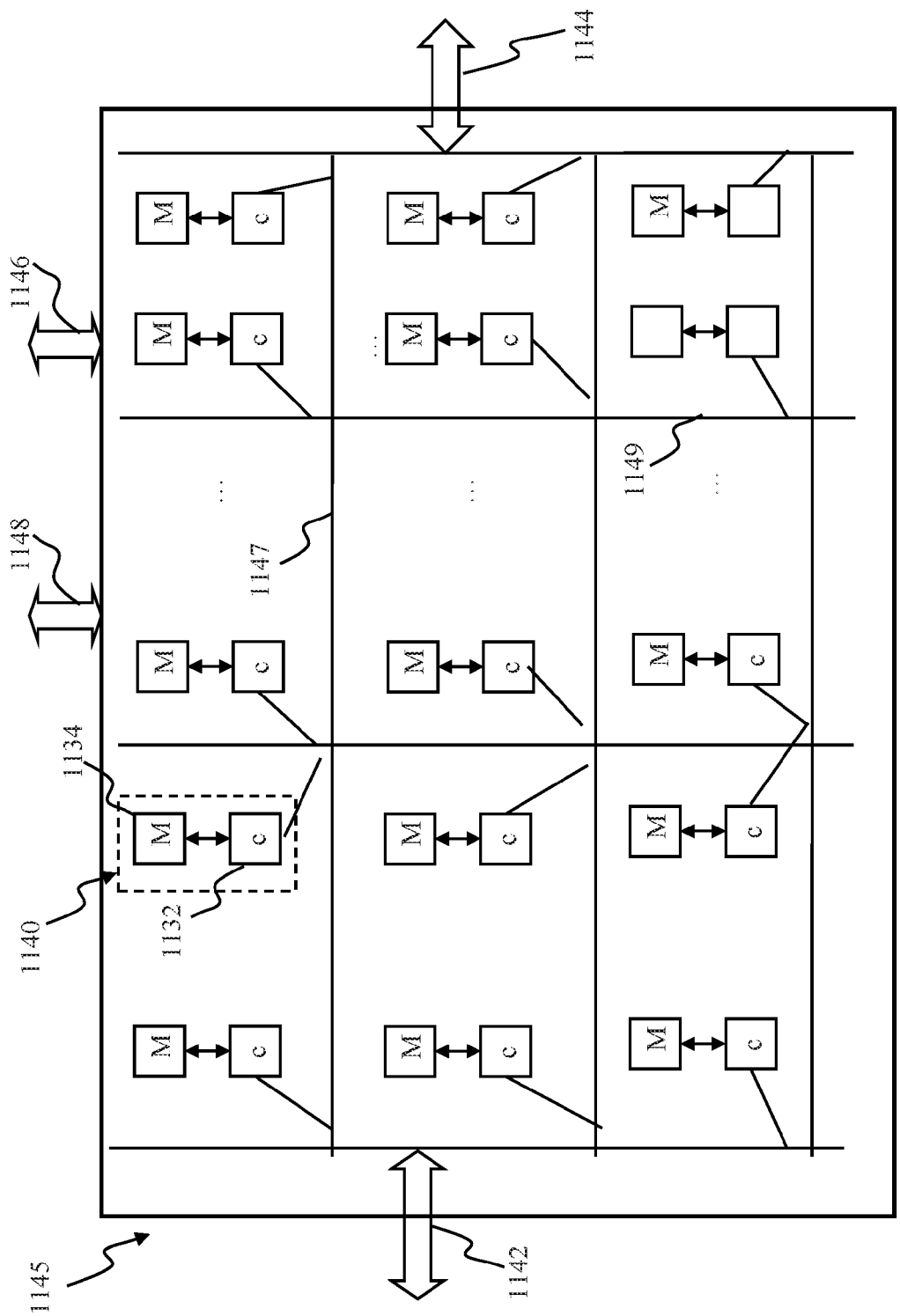
FIG. 11C is a block diagram illustrating a hierarchical neuromorphic computerized system architecture useful with, inter alia, haptic learning methodology, in accordance with one or more implementations.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

Figure 11D:
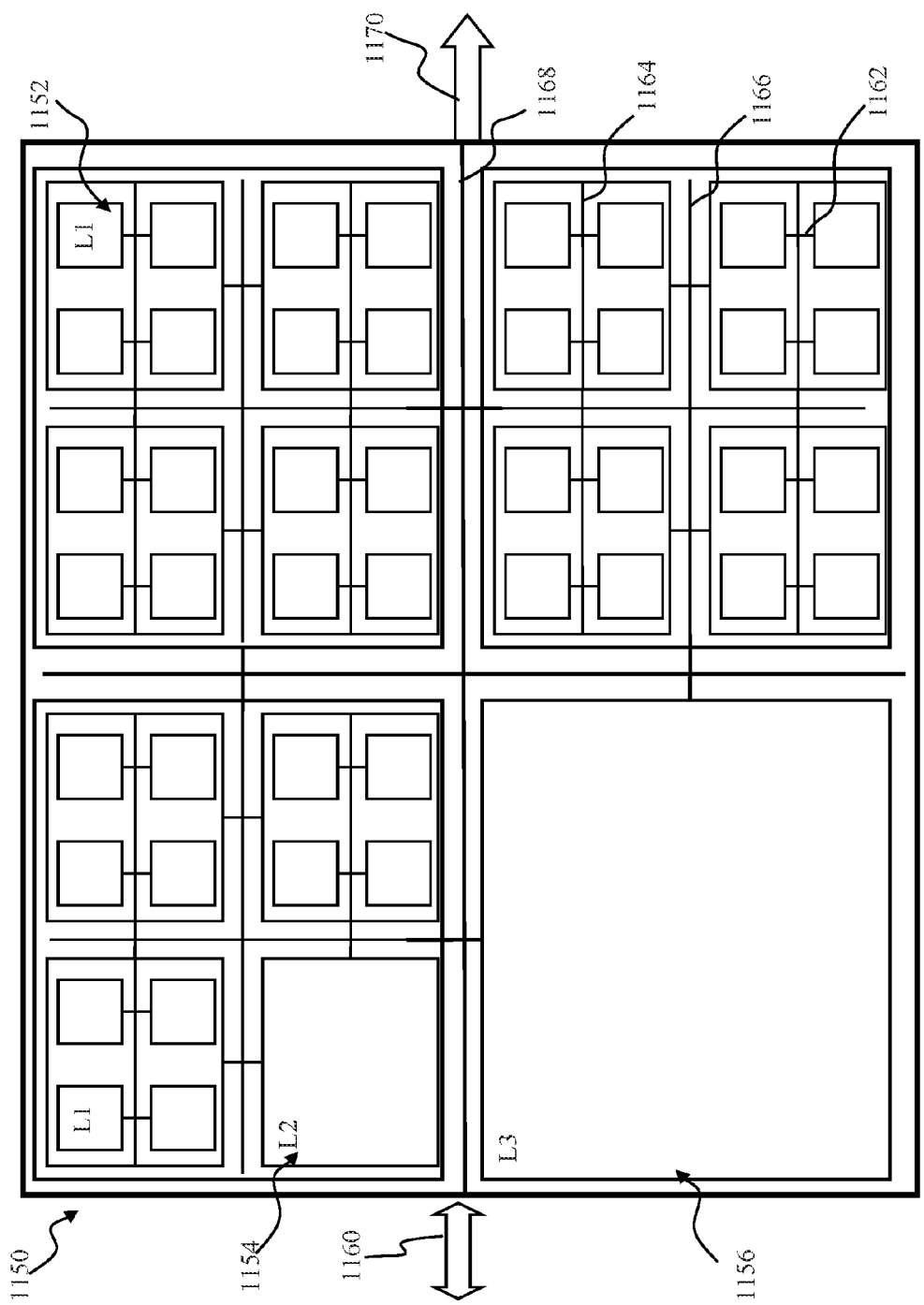
FIG. 11D is a block diagram illustrating cell-type neuromorphic computerized system architecture useful with, inter alia, haptic learning methodology, in accordance with one or more implementations.

FIG. 11D illustrates one implementation of cell-based neuromorphic computerized system architecture configured to implement haptic learning using a parallel network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 11B. A number of cell blocks may be arranged in a cluster and may communicate with one another via local interconnects 1162, 1164. Individual clusters may form higher level cell, e.g., cell L2, denoted as 1154 in FIG. 11D. Similarly, several L2 clusters may communicate with one another via a second level interconnect 1166 and form a super-cluster L3, denoted as 1156 in FIG. 11D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, individual L1 cells may process in parallel different portions of the visual input (e.g., encode individual pixel blocks, and/or encode motion signal), with the L2, L3 cells performing progressively higher level functionality (e.g., object detection). Individual ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task, as described for example the application '576, referenced supra.

In one or more implementations, one or more portions of the apparatus 1150 may be configured to operate one or more learning rules, as described for example in the application '576 referenced supra. In one such implementation, one block (e.g., the L3 block 1156) may be used to process input received via the interface 1160 and to provide a teaching signal to another block (e.g., the L2 block 1156) via interval interconnects 1166, 1168.

Training of adaptive robotic devices using the haptic training methodology set forth herein may advantageously be utilized in various applications, including, e.g., autonomous navigation, assisted living, healthcare, object manipulation, tracking, object pursuit, locomotion, and/or other applications of robotics.

The haptic training approach may provide, via a physical contact, a natural, intuitive teaching interface to correct a behavior of the robot. In some implementations of, e.g., elder care, the haptic training approach may be utilized in lieu of remote manipulation of the robot via a remote control device thereby facilitating training of robots by persons with limited dexterity and/or limited experience of working with remotely operated robotic devices.

In some implementations, the haptic training may obviate use of remote control devices whereby simplifying training and/or reducing costs associated therewith. The haptic training approach to motion capture and/or teleoperation devices may simplify and/or altogether eliminate use of additional hardware (e.g., motion capturing gloves, a joystick, a gesture-based control device, a multi degree of freedom remote controllers and/or other).

In contrast to some existing approaches of leaning from demonstration, the haptic learning methodology of the disclosure may not require explicit physical correspondence between the teacher body configuration and the robot configuration.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the disclosure. The scope of the disclosure should be determined with reference to the claims.

What is claimed:

1. A method of operating a robot comprising:
   determining a first control signal associated with an environmental context of the robot;
   causing, based at least in part on the determined first control signal, the robot to perform a task characterized by a target trajectory; and
   responsive to observing a discrepancy between an actual trajectory and the target trajectory, adjusting the actual trajectory based at least in part on a physical contact by an operator with the robot, wherein adjusting of the actual trajectory comprises determining a second control signal configured to cooperate with the first control signal to cause the robot to transition the actual trajectory towards the target trajectory in a subsequent performance of the task in the environmental context.

2. The method of claim 1, further comprising performing a learning process that associates the first control signal with the environmental context.

3. The method of claim 2, wherein determining the second control signal further comprises modifying the learning process.

4. The method of claim 2, wherein the learning process comprises a supervised learning process configured to adjust based at least in part on a teaching signal comprising a prior motor control output and a motor command correction.

5. The method of claim 2, wherein:
   the learning process is configured based on a teaching signal; and the modifying of the learning process is configured based on the teaching signal being determined based on an evaluation of the adjusting of the actual trajectory.

6. The method of claim 1, wherein the physical contact comprises at least one of releasing, moving, manipulating, interacting with, and touching the robot.

7. The method of claim 1, further comprising:
determining as an output of a learning process the first and second control signals based at least in part on the environmental context of the robot; and
causing, based on the determined first and second control signal, the robot to perform the task characterized by the target trajectory.

8. The method of claim 1, further comprising determining the environmental context of the robot based at least in part on a sensory input.

9. A robot apparatus, comprising:
one or more actuators configured to maneuver the robot apparatus;
a sensor module configured to convey information related to an environment of the robot apparatus; and
an adaptive controller operable in accordance with a learning process configured to:
guide the robot apparatus using the one or more actuators to a target state in accordance with the information;
determine a discrepancy between a target trajectory that corresponds to the target state and a current trajectory that corresponds to a current state, the determination based at least in part on a physical contact by a user; and
update the learning process based on the determined discrepancy, wherein the updated learning process comprises a determination of a correction signal to guide the robot apparatus using the one or more actuators to the target state based on a subsequent conveyance of information by the sensor module.

10. The apparatus of claim 9, wherein the learning process is configured in accordance with a teaching signal.

11. The apparatus of claim 10, wherein the guiding of the robot apparatus using the one or more actuators to the target state is configured based on a control signal determined by the learning process in accordance with the conveyed information, and the teaching signal is configured based on the correction signal.

12. The apparatus of claim 11, wherein the teaching signal is inferred based at least in part on a comparison between the current state and the target state.

13. The apparatus of claim 9, wherein the physical contact comprises at least one of releasing, moving, manipulating, interacting with, and touching the robot apparatus.

14. The apparatus of claim 9, wherein the target state is a first pose of the robot apparatus and the current state is a second pose of the robot apparatus.

15. The apparatus of claim 9, wherein the robot apparatus is an autonomous vehicle.

16. A non-transitory computer readable medium comprising a plurality of instruction which, when executed by one or more processors, effectuate control of a robotic apparatus by:
based on a context, determine a first control signal configured to transition the robotic apparatus to a first state;
determine a discrepancy between a current trajectory associated with a current state, and a first trajectory associated with the first state, where the discrepancy between the trajectories comprises a measurable difference; and
determine a second control signal based on the discrepancy, the second control signal configured to transition the robotic apparatus to the current state.

17. The non-transitory computer readable medium of claim 16, wherein the determination of the first control signal and the determination of the second control signal are configured in accordance with a learning process.

18. The non-transitory computer readable medium of claim 17, wherein:
a change in the context is configured to cause an adaptation of the learning process, the adaptation being configured to produce another version of a control signal; and
the context is configured to convey information related to one or more of a sensory input, a robot state, and the teaching signal.

19. The non-transitory computer readable medium of claim 16, wherein:
individual ones of the current state and the first state are characterized by a state parameter; and
the determination of the discrepancy is configured based on an evaluation of a distance measure between the state parameter of the current state and the state parameter of the first state.

20. The non-transitory computer readable medium of claim 16, wherein the discrepancy is based at least in part on a physical contact by a user.

* * * * *